(12) United States Patent
Whitehouse et al.

(10) Patent No.: US 11,429,919 B1
(45) Date of Patent: Aug. 30, 2022

(54) SYSTEMS AND METHODS FOR SHIPMENT CONSOLIDATION

(71) Applicant: PSI Systems, Inc., Mountain View, CA (US)

(72) Inventors: Harry T. Whitehouse, Portola Valley, CA (US); Samuel Leinbach, Belmont, CA (US)

(73) Assignee: PSI Systems, Inc., Mountain View, CA (US)

( * ) Notice: Subject to any disclaimer, the term of this patent is extended or adjusted under 35 U.S.C. 154(b) by 0 days.

(21) Appl. No.: 17/003,177

(22) Filed: Aug. 26, 2020

Related U.S. Application Data

(63) Continuation of application No. 15/250,113, filed on Aug. 29, 2016, now Pat. No. 10,824,982.

(51) Int. Cl.
   *G06Q 10/08* (2012.01)
(52) U.S. Cl.
   CPC ............... *G06Q 10/0832* (2013.01)
(58) Field of Classification Search
   CPC ............ G06Q 10/0832; G06Q 10/02; G06Q 10/0641; G06Q 10/067; G06Q 10/07; G06Q 10/083; G06Q 10/087; H04W 4/02
   (Continued)

(56) References Cited

U.S. PATENT DOCUMENTS 6,795,823 B1 * 9/2004 Aklepi .................... G06Q 10/08
707/781
8,918,340 B2 * 12/2014 Kadaba .............. G06Q 10/0637
705/333

(Continued)

FOREIGN PATENT DOCUMENTS

WO   WO-2017166127 A1 * 10/2017 ......... G06Q 10/0833

OTHER PUBLICATIONS

"Consolidated Freightways Becomes First Major Motor Carrier to Offer Customer Service Guide Through the Internet; Guide Provides Routing Information at the Click of a Button," Mar. 6, 1997, Business Wire (Year: 1997).*

(Continued)

*Primary Examiner* — Jeff Zimmerman
*Assistant Examiner* — Brian Adams Heflin
(74) *Attorney, Agent, or Firm* — Norton Rose Fulbright US LLP

(57) ABSTRACT

Systems and methods which provide for intelligent and/or optimized use of shipping services through facilitating consolidation of shipped items with respect to one or more leg of shipments are described. Embodiments provide a shipping consolidation management system operable to analyze various shipping parameters and identify situations in which consolidation of shipped items with respect to one or more legs of a shipment may be desired. Shipping consolidation management systems may provide operation to identify situations appropriate for forming consolidated shipments associated with a single shipper and/or a plurality of shippers. A shipping consolidation management system of embodiments operates to print consolidated shipment documentation for use with respect to the consolidated shipment. Embodiments may utilize various different shipping service providers and/or shipping services with respect to legs of shipments having a consolidated shipment, such as may include traditional shipping service providers and/or service providers not traditionally considered as shipping service providers.

18 Claims, 3 Drawing Sheets

(58) Field of Classification Search
USPC .......................................................... 705/332
See application file for complete search history.

(56) References Cited

U.S. PATENT DOCUMENTS

| | | | |
|---|---|---|---|
| 11,107,029 B1* | 8/2021 | Henry | ..................... H04L 67/34 |
| 2003/0171948 A1 | 9/2003 | Thomas et al. | |
| 2005/0149373 A1* | 7/2005 | Amling | .............. G06Q 10/0831 |
| | | | 705/28 |
| 2006/0229895 A1* | 10/2006 | Kodger | .................. G06Q 10/08 |
| | | | 705/333 |
| 2006/0235739 A1 | 10/2006 | Levis et al. | |
| 2011/0099121 A1* | 4/2011 | Holley | ............... G06Q 10/0833 |
| | | | 705/333 |
| 2012/0109765 A1 | 5/2012 | Araque | |
| 2014/0180957 A1 | 6/2014 | Arunapuram | |
| 2016/0334797 A1 | 11/2016 | Ross et al. | |
| 2017/0262801 A1 | 9/2017 | Wier | |
| 2018/0240067 A1 | 8/2018 | Oz et al. | |

OTHER PUBLICATIONS

U.S. Appl. No. 15/187,401, Felix et al.

* cited by examiner

SYSTEMS AND METHODS FOR SHIPMENT CONSOLIDATION

CROSS-REFERENCE TO RELATED APPLICATIONS

The present application is a continuation of U.S. patent application Ser. No. 15/250,113, filed on Aug. 29, 2016, entitled "Systems and Methods for Shipment Consolidation," and the disclosure of which is incorporated herein by reference in its entirety.

TECHNICAL FIELD

The invention relates generally to shipment of items and, more particularly, to providing for consolidation of shipped items.

BACKGROUND OF THE INVENTION

The shipment of items, such as new and used goods shipped from merchants or other shippers to purchasers or other recipients, has been commonplace for years. For example, it is commonplace for various merchants, whether they be "brick and mortar" merchants, online merchants, or sellers through an electronic marketplace (e.g., eBay, Amazon Marketplace, Shopify, etc.), to ship goods using a number of forms of shipping services and media, such as letters, flats, and parcels, via various shipping service providers, such as the United States Postal Service (USPS), United Parcel Service (UPS), Federal Express (FedEx), Dalsey, Hillblom and Lynn (DHL), local and regional couriers, trucking companies providing truckload (TL) services and/or less than truckload (LTL) services (e.g., J.B. Hunt, Arkansas Best Freight (ABF), YRC Freight, etc.), and/or the like.

The shipping service providers offer various shipping services to shippers, often having different shipping parameters, transit times, costs, shipper/recipient/shipped item qualifications, etc. associated therewith. For example, many shipping service providers offer different levels of service (e.g., origination point pickup and/or destination point delivery, shipping service provider depot drop off and/or shipping service provider depot pickup, standard delivery/expedited delivery/overnight delivery, tracking, delivery point signature required, etc.). Further, many shipping service providers offer different shipping services (e.g., USPS retail ground, USPS priority mail, USPS priority mail express, USPS priority mail express open and distribute, etc.). Unfortunately, it is often very difficult for a shipper to consider all the permutations of options available from a particular shipping service provider, much less all the permutations of options available from the several shipping service providers they may use regularly. Accordingly, shippers often use particular shipping services, and even shipping service providers, they have used in the past without fully considering their options and/or without optimizing their use of the available shipping services.

With the advent of the Internet and the advent of innumerable e-commerce merchants and marketplaces, not only have the number of items shipped increased appreciably in recent years, but so too have the number of shippers and recipients of such items. Accordingly, there is an increasing number of mid-sized, small, and even individual shippers shipping an increasing number of items. Such smaller shippers (i.e., mid-sized, small, and individual shippers as compared to large scale businesses traditionally involved with high volume shipping) are typically less sophisticated with respect to shipping and thus are even less likely to utilize various shipping services of one or more shipping service providers without fully considering their options and/or without optimizing their use of the available shipping services.

BRIEF SUMMARY OF THE INVENTION

The present invention is directed to systems and methods which provide for intelligent and/or optimized use of available shipping services through facilitating consolidation of shipped items with respect to one or more leg of shipments. Embodiments provide a shipping consolidation management system operable to analyze various shipping parameters and identify situations in which consolidation of shipped items with respect to one or more legs of a shipment may be desired (e.g., provides for reduced shipping costs, provides for expedited delivery of shipped items, etc.). Logic of a shipping consolidation management system of embodiments may operate to select a particular shipping service provider, a particular shipping service, a particular leg of a shipment, particular shippers, particular recipients, and/or particular shipped items for consolidation in a consolidated shipment. The consolidation of shipped items according to embodiments provides for a consolidated shipment wherein a plurality shipped items are aggregated into a single shipping unit (e.g., nested in a bag or box, wrapped or otherwise incarcerated on a pallet, etc.), wherein the shipping unit is transported by one or more shipping service providers for at least one leg (referred to herein as a consolidated shipment leg) of the shipment of the consolidated shipped items.

Although a shipping consolidation management system may provide operation to identify situations appropriate for forming consolidated shipments of shipped items from a single shipper (e.g., a shipper having a relatively large number of shipped items destined for a same shipping region or zone), embodiments of a shipping consolidation management system provide operation to facilitate consolidation of items shipped from a plurality of shippers (e.g., two or more shippers, at least one having too few shipped items destined for a particular region or zone to justify forming a consolidated shipment to that region or zone). Consolidation of shipped items from multiple shippers to form a shipping unit of a consolidated shipment may be performed according to embodiments at a shipper location (e.g., by a shipper or shipper service provider personnel, such as route driver), at a shipping service provider location (e.g., at a shipping service provider terminal or warehouse or in a shipping service provider vehicle), or at a third party location (e.g., at a package service location, a shipping consolidation management provider location, or at a self-service kiosk).

A shipping consolidation management system of embodiments operates to print consolidated shipment documentation (e.g., consolidated shipment shipping unit shipping labels, tracking number information, packing lists, manifests, hazardous cargo declarations, etc.) for use with respect to the consolidated shipment shipping unit. Irrespective of where the shipping unit of a consolidated shipment is formed, one or more shippers having shipped items consolidated may provide the printing of such documentation, or some portion thereof. Additionally or alternatively, a shipping service provider (e.g., route driver personnel, shipping service provider terminal or warehouse personnel, etc.) may provide the printing of such documentation, or some portion thereof. The individual shipped items within a shipping unit of a consolidated shipment of embodiments are to be delivered to a plurality of different delivery points. Accordingly, the consolidated shipment documentation printed by a shipping consolidation management system of embodiments includes individual shipped item shipping labels (e.g., shipping labels including valid postage indicia) for a delivery leg of the shipment of a respective shipped item. For example, each shipper having shipped items consolidated may provide the printing of such documentation for their respective shipped items, whereby the shipped items within a consolidated shipment shipping unit may have origination leg and/or delivery leg shipping labels applied thereto and the shipping unit may have a consolidated shipment shipping unit shipping label applied thereto.

Embodiments may utilize various different shipping service providers and/or shipping services with respect to legs of shipments having a consolidated shipment. For example, where shipped items from a plurality of different shippers are consolidated into a shipping unit herein, embodiments may utilize one or more shipping service providers well suited to collect shipped items from the plurality of shippers and transport the shipped items from an origination location to a consolidation location in an origination leg of the shipment, whereas one or more shipping service providers well suited for transporting larger shipping units may be utilized to transport the shipped items from a consolidation location to a deconsolidation location in a consolidated shipment leg of the shipment, and one or more shipping service providers well suited for delivery of shipped items to individual delivery locations from a deconsolidation location may be utilized to transport the shipped items in a delivery leg of the shipment. Although the shipping service providers utilized in an origination leg and/or delivery leg of shipments of embodiments may include traditional shipping service providers (e.g., USPS, UPS, FEDEX, etc. route drivers) commonly used for collection of shipped items from shippers, the shipping service providers utilized in an origination leg and/or delivery leg may additionally or alternatively include service providers not traditionally considered as shipping service providers, such as freelance drivers (e.g., drivers of the UBER transportation service), cab drivers, local delivery truck (e.g., furniture and appliance delivery, household moving van, etc.) drivers, etc. Similarly, although the shipping service providers utilized in a consolidated shipment leg of shipments of embodiments may include traditional shipping service providers (e.g., USPS, UPS, FEDEX, etc. center-to-center trucking), the shipping service providers utilized in a consolidated shipment leg may additionally or alternatively include shipping service providers not traditionally available to the shippers and/or for the shipment of the shipped items, such as LTL trucking companies, TL trucking companies, freelance truckers, etc.

To facilitate consolidated shipping, to facilitate the use of non-traditional shipping service providers, and/or to facilitate the use of shipping service providers not traditionally available to the shippers and/or for the shipment of the shipped items according to embodiments, a shipping consolidation management system may comprise one or more applications, such as may include server applications, workstation or client applications, third party consolidator applications, and/or mobile applications, cooperative to provide operation in accordance with the concepts herein. For example, embodiments of a shipping consolidation management system may comprise one or more driver mobile apps (e.g., an application operable upon smartphones, personal digital assistants (PDAs), and/or tablet devices carried by route drivers, delivery drivers, freelance drivers, etc.) operable to dispatch drivers for collection of shipped items, consolidation of shipped items, transporting shipped items, delivery of shipped items, etc. Additionally or alternatively, one or more applications (e.g., a driver mobile app, a workstation or client application, etc.) of a shipping consolidation management system of embodiments may operate to allow shipping service providers to submit bids (e.g., proposing terms such as price, service level, transportation time, etc.) for shipping services with respect to shipped items, shipping units, shipment legs, etc.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

DETAILED DESCRIPTION OF THE INVENTION

Figure 1A:
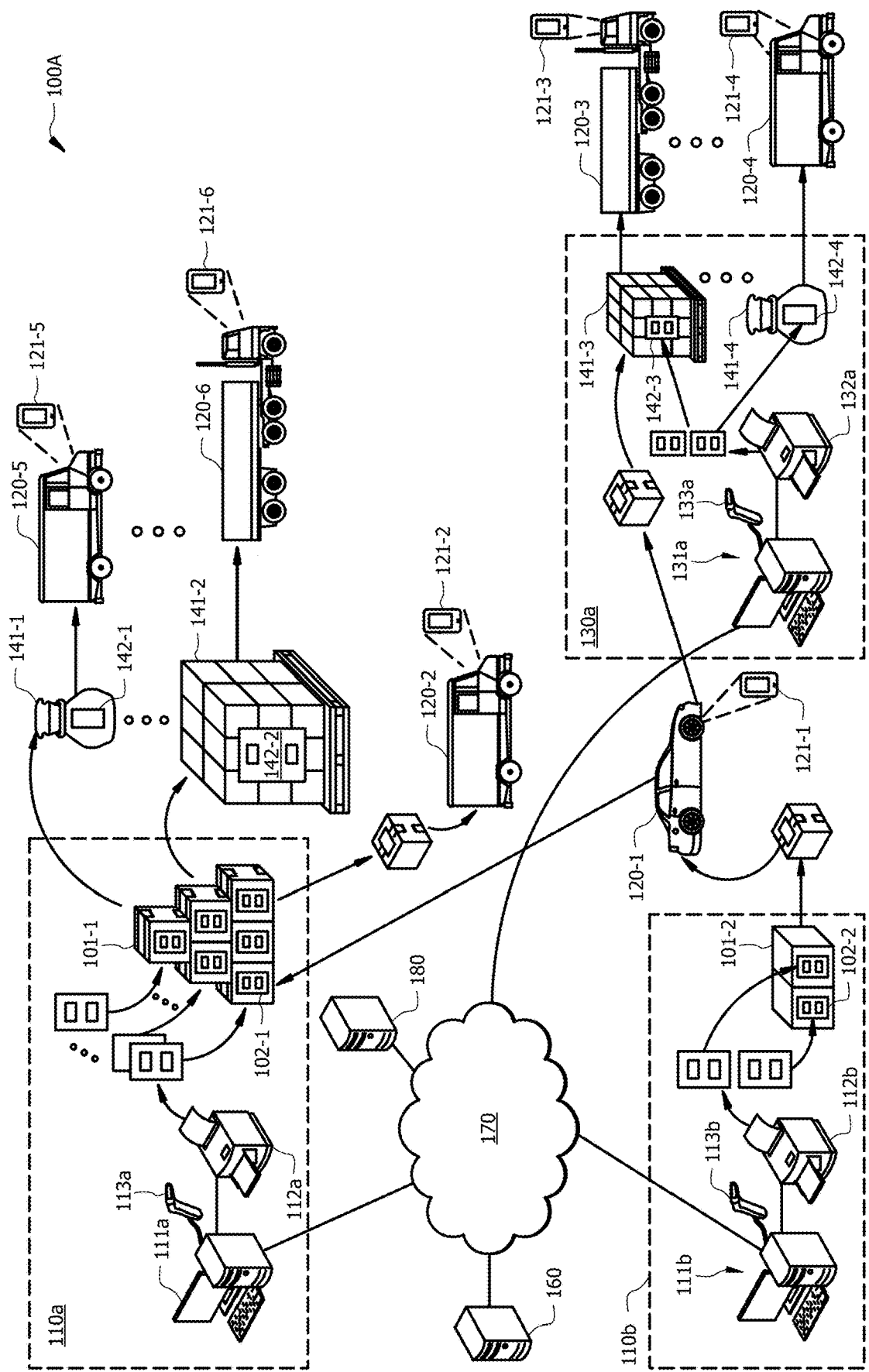
FIGS. 1A and 1B show shipping consolidation management system configurations in accordance with embodiments of the invention.
Figure 1B:
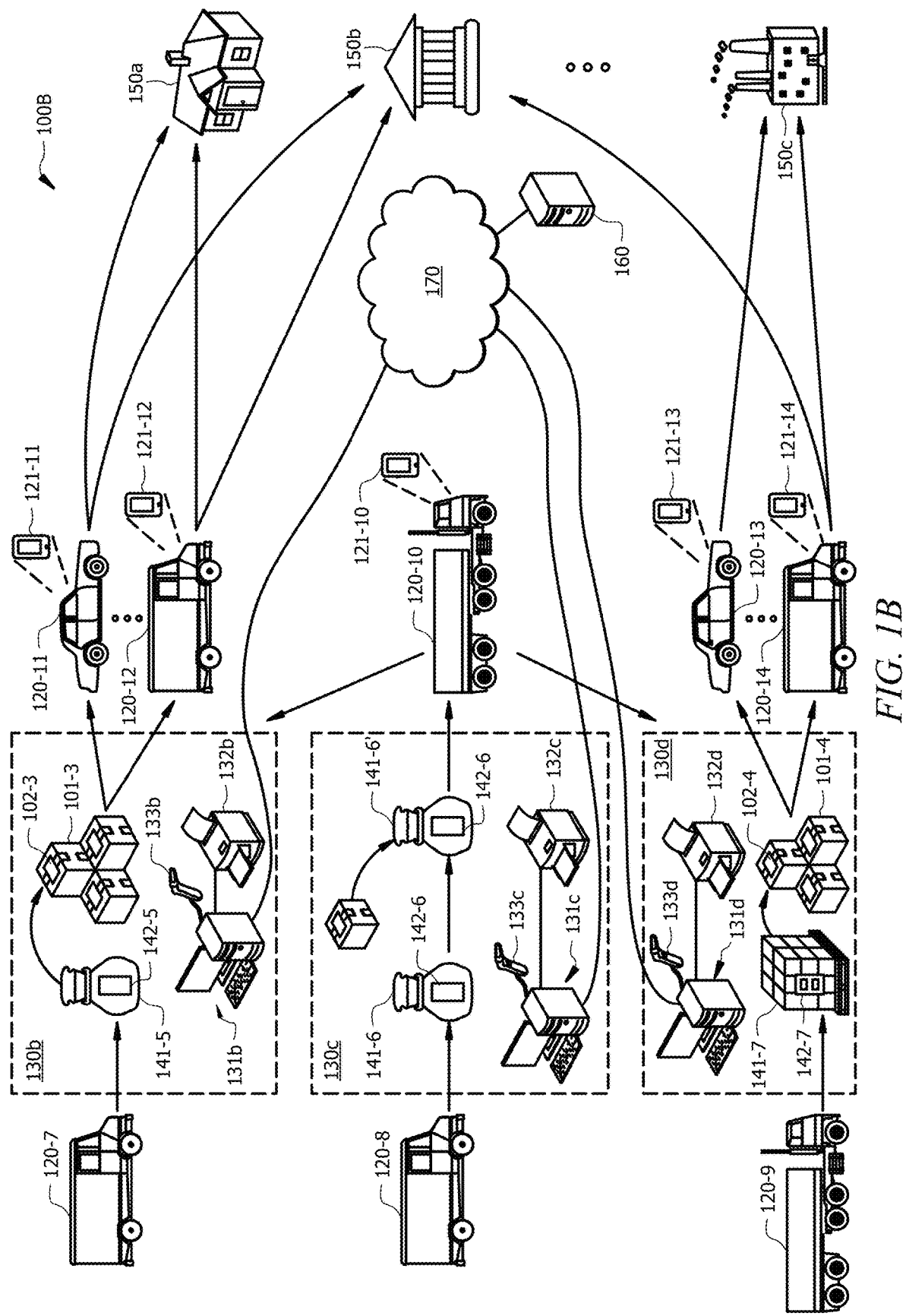

Shipping consolidation management system configurations in accordance with embodiments of the invention to facilitate consolidation of shipped items with respect to one or more leg of shipments are shown in FIGS. 1A and 1B. Embodiments of shipping consolidation management system 100A of FIG. 1A are adapted to provide operation with respect to origination and consolidated shipment legs of shipments according to concepts herein, while embodiments of shipping consolidation management system 100B of FIG. 1B are adapted to provide operation with respect to consolidated shipment and delivery legs of shipments according to concepts herein.

It should be appreciated that, although shown as separate for simplifying the illustrations, shipping consolidation management systems 100A and 100B may form parts of a same shipping consolidation management system (e.g., shipping consolidation management system 100A providing origination and consolidation shipment functionality and shipping consolidation management system 110B providing consolidation shipment functionality and delivery functionality of a shipping consolidation management system). Accordingly, consolidation management server system 160 shown in FIGS. 1A and 1B may be the same consolidation management server system or different consolidation management server systems as between shipping consolidation management systems 100A and 100B depending upon the particulars of an implementation. Likewise, although shown with differing reference numerals, any of shipping service assets 120-3 through 120-6 of FIG. 1A may correspond to any of shipping service assets 120-7 through 120-9 of FIG. 1B and any of shipping units 141-1 through 141-3 of FIG. 1A may correspond to any of shipping units 141-5 through 141-7 of FIG. 1B.

The embodiments of shipping consolidation management systems 100A and 100B illustrated in FIGS. 1A and 1B include a plurality of systems operable cooperatively to facilitate consolidated shipments. Accordingly, the configuration of shipping consolidation management system 100A illustrated in FIG. 1A includes shipper computer systems 111*a* and 111*b*, shipping service provider mobile devices 121-1 through 121-6, service terminal computer system 131*a*, consolidation management server system 160, and shipping resource server 180 in communication via network 170. Similarly, the configuration of shipping consolidation management system 100B illustrated in FIG. 1B includes service terminal computer systems 121*b* through 121*d*, shipping service provider mobile devices 121-10 through 121-14, and consolidation management server system 160 in communication via network 170.

Each of shipper computer systems 111*a* and 111*b*, shipping service provider mobile devices 121-1 through 121-6 and 121-10 through 121-14, service terminal computer systems 131*a* through 131*d*, consolidation management server system 160, shipping resource server 180 may comprise one or more processor-based system (e.g., a computer based on the Intel CORE family of processors) having computer readable memory (e.g., random access memory (RAM), read only memory (ROM), hard disk drive memory, solid state disk drive memory, flash memory, etc.) operable to store and execute one or more instruction set (e.g., operating system, application program, applet, user interface, etc.) providing functionality as described herein and having suitable infrastructure and/or peripheral devices (e.g., network interface card (NIC), display device, keyboard, digital pointer, printer, audio output device, wireless communications interface, etc.) to support the described functionality. For example, any or all of shipper computer systems 111*a* and 111*b*, service terminal computer systems 131*a* through 131*d*, and consolidation management server system 160 may comprise personal computers (PCs), portable computers, tablet devices, computer networks, computer based servers, server farms, processor-based kiosk systems, and/or the like operable under control of one or more instruction sets providing operation and functionality according to the concepts herein. Additionally or alternatively, any or all of shipping service provider mobile devices 121-1 through 121-6 and 121-10 through 121-14 may, for example, comprise portable computers, tablet devices, smartphones, PDAs, and/or the like operable under control of one or more instruction sets providing operation and functionality according to the concepts herein.

The aforementioned processor-based systems may comprise various functionality and/or devices utilized in providing shipping consolidation management according to the concepts herein. For example, shipper computer systems 111*a* and 111*b* and service terminal computer systems 131*a* through 131*d* are shown as including printers (i.e., printers 112*a*, 112*b*, and 132*a* through 132*d*), such as may comprise ink printers, laser printers, thermal printers, etc., and scanners (i.e., scanners 113*a*, 113*b*, and 133*a* through 133*d*), such as may comprise flatbed scanners, barcode scanners, image capture devices, etc. It should be appreciated that, although not expressly illustrated, any or all of shipping service provider mobile devices 121-1 through 121-6 and 121-10 through 121-14 may likewise include such devices.

Network 170 may comprise one or more networks providing data communication between any or all of shipper computer systems 111*a* and 111*b*, shipping service provider mobile devices 121-1 through 121-6 and 121-10 through 121-14, service terminal computer systems 131*a* through 131*d*, and consolidation management server system 160. For example, network 170 may comprise a local area network (LAN), a wireless LAN (WLAN), a metropolitan area network (MAN), a wide area network (WAN), a cellular network, a cable transmission system, the public switched telephone network (PSTN), the Internet, an extranet, an intranet, and/or the like.

It should be appreciated that a limited number of shippers, service terminals, and recipients are represented in the embodiments illustrated in FIGS. 1A and 1B for simplicity. Shipping consolidation management systems 100A and 100B of embodiments may, however, serve any number of shippers and/or recipients using any number of shipping service providers and service terminals.

In operation according to embodiments of shipping consolidation management system herein, a plurality of items (e.g., as may include items 101-1 and 101-2, as may contain various goods or other articles, shown in FIG. 1A) may be transported from one or more shippers (e.g., at one or more shipper location, as may include shipper locations 110*a* and 110*b* of FIG. 1A) to one or more recipients (e.g., at one or more recipient locations, as may include recipient locations 150*a* through 150*c* of FIG. 1B). Shipping consolidation management system 100A and/or 100B of embodiments implement functionality with respect to such shipments to provide intelligent and/or optimized use of available shipping services through facilitating consolidation of the shipped items. For example, logic of consolidation management server system 160, utilizing information regarding shipment of the items as may be provided by various systems such as shipper computer systems 111*a* and 111*b*, may operate to analyze various shipping parameters and identify situations in which consolidation of the shipped items may be desired (e.g., consolidation of shipped items with respect to one or more legs of a shipment provides for reduced shipping costs, provides for expedited delivery of shipped items, etc.). Accordingly, logic of shipping consolidation management system 160 of embodiments may operate to select a particular shipping service provider, a particular shipping service, a particular leg of a shipment, particular shippers, particular recipients, and/or particular shipped items for consolidation in a consolidated shipment.

The consolidation of shipped items according to embodiments provides for a consolidated shipment wherein a plurality shipped items (e.g., including items 101-1 and 101-2) from one or more shippers are aggregated into a single shipping unit (e.g., nested in a bag, such as the bags of shipping units 141-1 and 141-4, wrapped or otherwise incarcerated on a pallet, such as the pallets of shipping units 141-2 and 141-3, etc.). For example, the items being shipped by a shipper (e.g., a shipper associated with shipper location 110*a*) may be consolidated into one or more shipping units (e.g., either or both of shipping units 141-1 and 141-2) when determined to be advantageous or otherwise desirable. Similarly, the items being shipped by a plurality of shippers (e.g., shippers associated with shipper locations 110*a* and 110*b*) may be consolidated into one or more shipping units (e.g., any or all of shipping units 141-1 through 141-4) when determined to be advantageous or otherwise desirable.

The items from one or more shippers to be consolidated may be transported in an origination leg of the shipment for consolidation by one or more shipping service providers (e.g., using any or all of shipping service assets 120-1 and 120-2). The resulting shipping units may be transported by one or more shipping service providers (e.g., using any or all of shipping service assets 120-3 through 120-5 and 120-7 through 120-10 for at least one leg (i.e., a consolidated shipment leg) of the shipment of the consolidated shipped items according to embodiments. The shipping units may be deconsolidated, such as at a service terminal near a delivery point or that is centrally located with respect to the delivery points for the items in the shipping unit (e.g., within a same shipping zone or near the shipping zones for each delivery point of the items in the shipping unit), and transported by one or more shipping service providers (e.g., using any or all of shipping service assets 120-11 through 121-14).

Shipping consolidation management system 100A of embodiments operates to print consolidated shipment documentation (e.g., shipping labels, valid postage indicia, consolidated shipment shipping unit shipping labels, tracking number information, packing lists, manifests, hazardous cargo declarations, etc.) for use with respect to shipped items. For example, shippers having shipped items consolidated may print (e.g., using a respective one of printers 112a and 112b) consolidated shipment shipping unit shipping labels, or some portion thereof, for use in transporting shipping units (e.g., shipping unit shipping labels 142-1 through 142-3 and 142-5 through 142-7 used for respective ones of shipping units 141-1 through 141-3 and 141-5 through 141-7) in a consolidated shipment leg of the shipment of their items. Additionally or alternatively, a shipping service provider (e.g., route driver personnel of shipping service assets 120-1 through 120-6 and 120-10, shipping service provider terminal or warehouse personnel of service terminal locations 130a and 130c, etc.) may print (e.g., using printer functionality of, or associated with, respective ones of shipping service provider mobile devices 121-1 through 121-6 and 121-10 and/or printers 132a and 131c) such consolidated shipment shipping unit shipping labels, or some portion thereof. As the individual shipped items within a shipping unit of embodiments are to be delivered to a plurality of different delivery points, the consolidated shipment documentation printed (e.g., using printers 112a and 112b, printer functionality of, or associated with, and/or shipping service provider mobile devices 121-1 through 121-6 and 121-10 and/or printers 132a and 131c) by shipping consolidation management system 100A of embodiments includes individual shipped item shipping labels (e.g., shipped item shipping labels 102-1 and 102-2 used for respective ones of shipped items 101-1 and 101-2) in an origination leg and/or a delivery leg of the shipment of the items. for a delivery leg of the shipment of a respective shipped item. Accordingly, the shipped items within a shipping unit may have shipping labels (e.g., as may be utilized in an origination leg, a delivery leg, or both) applied thereto and the shipping unit may have a shipping unit shipping label (e.g., as may be utilized in a consolidated shipment leg of the shipment) applied thereto.

It should be appreciated that the shipping service providers and/or shipping services utilized with respect to any particular leg of a shipment, or even with respect to a portion of any particular let of a shipment, may be different. For example, route drivers for one or more shipping service provider, such as USPS, UPS, FEDEX, etc., may be utilized to initially pickup and transport shipped items in an origination leg of a shipment. In embodiments of the invention, drivers for one or more services not traditionally considered as shipping service providers may be utilized to initially pickup and transport shipped items in an origination leg of a shipment. For example, freelance drivers (e.g., drivers of the UBER transportation service), cab drivers, local delivery truck (e.g., furniture and appliance delivery, household moving van, etc.) drivers, etc. may be dispatched to collect one or more shipped items and transport the shipped items to another shipper location or a service terminal location at which shipped items are consolidated. The shipping service providers utilized in a consolidated shipment leg of shipments of embodiments may include traditional shipping service providers (e.g., USPS, UPS, FEDEX, etc. center-to-center trucking) and/or shipping service providers not traditionally available to the shippers and/or for the shipment of the shipped items, such as LTL trucking companies, TL trucking companies, freelance truckers, etc. Accordingly, shipping service providers providing transportation of shipped items in an origination leg of the shipment may be different than shipping service providers providing transportation of the shipped items in a consolidated shipment leg of the shipment. Moreover, the shipping services utilized with respect to an origination leg and a consolidated shipment leg of embodiments may be different. For example, a route driver for the USPS may be utilized to collect a shipped item from a shipper and transport the item in an origination leg in accordance with a USPS retail ground shipping service whereas a long haul driver for the USPS may be utilized to transport the item as part of a shipping unit in a consolidated shipment leg in accordance with a USPS priority mail express open and distribute shipping service. Route drivers for one or more shipping service provider, such as USPS, UPS, FEDEX, etc., and/or drivers for one or more services not traditionally considered as shipping service providers may be utilized to initially pickup and transport shipped items in an origination leg of a shipment. Accordingly, shipping service providers providing transportation of shipped items in a delivery leg of the shipment may be different than shipping service providers providing transportation of the shipped items in a consolidated shipment leg and/or an origination leg of the shipment. Similarly, the shipping services utilized with respect to a delivery leg may be different than the shipping services utilized with respect to a consolidated shipment leg and/or an origination leg according to embodiments.

Embodiments provide unified tracking information for the multiple shipment legs (e.g., origination leg, consolidated shipment leg, and/or delivery leg) to provide homogenized tracking reporting with respect to the various legs as well as to accommodate the use of a number of different shipping service providers utilized in providing the shipping services for such shipment legs. In operation according to embodiments, unified tracking information (e.g., such as may comprise a unified tracking number) for the multiple leg shipment may be linked to one or more tracking numbers for the individual shipment legs (e.g., a trip dispatch number or other substantially unique identifier assigned with respect to a freelance driver service used for a origination leg, a LTL trucking company pallet tracking number used for a consolidated shipment leg, and a USPS priority mail express open and distribute package tracking number used in a delivery leg). Such unified tracking information may comprise a unique or substantially unique (where "substantially unique" refers to the attribute being unique in normal or expected use, although the attribute may not be globally unique and its use may even be repeated in the system where repeated uses are not expected to overlap) number, such as may be created by one or more processor-based system of consolidation management system 100A, associated with tracking number and/or other information for the multiple shipment legs of a consolidated shipment. Alternatively, the tracking number and/or other information for one of the shipment legs may be associated with tracking numbers and/or other information for the other ones of the shipment legs and thus utilized as a "master" tracking number to provide unified tracking information for reporting tracking information etc. with respect to the multiple shipment legs of a consolidated shipment. Irrespective of the particular form of the unified tracking information, such unified tracking information is preferably associated with the multiple legs of a consolidated shipment for each item of the consolidated shipment, wherein information regarding the status of the shipment of a corresponding item is updated to reflect status provided with respect to the multiple legs of the shipping services.

As an example, unified tracking information assigned to item 101-2 may be utilized to report tracking information for the origination leg, such as wherein a route driver of shipping service asset 120-1 (e.g., as may be provided by a freelance driver service for example) may report picking up item 101-2 via an interactive driver mobile app associating the item with a trip dispatch number or other substantially unique identifier. Thereafter, the driver mobile app may provide real-time tracking of item 101-2 in the origination leg of the shipment via location services of shipping service provider mobile device 121-1. Additionally or alternatively, updated information regarding the origination leg of the shipment may be provided by the route driver entering or scanning events (e.g., delivery to an intermediate location, such as consolidation depot or other location) and/or other information via shipping service provider mobile device 121-1. Similarly, the unified tracking information assigned to item 101-2 may be utilized to report tracking information for the consolidated shipment leg, such as wherein a route driver of shipping service asset 120-3, 120-4, 120-5, or 120-6 (e.g., as may be provided by a LTL trucking company for example) scans or otherwise enters a pallet tracking number used for a shipping unit of a consolidated shipment leg in association with a pick-up event. It should be appreciated that a same pallet tracking number may be utilized for the consolidated shipment leg of all items consolidated into the shipping unit. Updated tracking information for the shipping unit, such as the aforementioned pallet pick-up, may be provided with respect to each of the individual items consolidated into the shipping unit using universal tracking information herein. Thereafter, events and information may be provided for the shipping unit, such as through use of GPS or satellite tracking of the shipping service provider asset, scanning or other data entry events for the shipping unit (e.g., delivery to an intermediate depot, delivery to a deconsolidation depot, etc.), and/or the like. Likewise, the unified tracking information assigned to item 101-2 may be utilized to report tracking information for the delivery leg, such as wherein USPS personnel scans or otherwise enters the individual priority mail tracking number for item 101-2 upon deconsolidation of the shipping unit in a priority mail express open and distribute process. Thereafter, information provided with respect to the priority mail package tracking number used in the delivery leg, such as information entered by various scan events, delivery of the package, etc., may be provided for the item. Such updated information provided with respect to any or all such legs of the multiple leg shipment of the item is preferably associated with the unified tracking information and thus may be reported or otherwise used to provide information regarding the shipping of item 101-2 through reference to the unified shipping information (e.g., status queries based on a unified tracking number).

It should be appreciated, that tracking information provided in association with tracking numbers for the individual shipment legs may be inaccurate with respect to the multiple leg shipment of a consolidated shipment herein. For example, tracking information provided in association with a tracking number for an origination leg of a shipment may report the item has having been delivered when the item reaches a depot at which consolidation is performed, tracking information provided in association with a consolidated shipment leg of a shipment may report the items as having been delivered when the shipping unit reaches a depot at which deconsolidation is performed, etc. Although such information may be accurate in the context of the particular leg, it is inaccurate in the context of the multiple leg shipment and thus may be confusing or otherwise undesirable to provide to a shipper or recipient. Accordingly, embodiments herein operate to manipulate tracking information provided in association with tracking numbers for the individual shipment legs to present unified tracking information that is accurate and otherwise appropriate to the multiple leg international shipment. Embodiments herein may additionally or alternatively manipulate tracking information provided in association with tracking numbers for the individual shipment legs to provide a more consistent user interface and experience, such as to homogenize formatting of reported information as between the different shipment legs as may have been reported by systems of different shipping service providers, to utilize a same lexicon to report similar events as between the different legs, etc.

Consolidation of shipped items to form a shipping unit may be performed at any of a number of locations by any of a number of personnel. For example, a shipper associated with shipper location 110a may consolidate a plurality of items being shipped by that shipper, such as within a bag of shipping unit 141-1 and/or on a pallet of shipping unit 141-2, at the shipper's location. Alternatively, a route driver associated with either or both of shipping service assets 120-5 and 120-6 may consolidate a plurality of items being shipped by a shipper associated with shipper location 110a, such as within a bag of shipping unit 141-1 and/or on a pallet of shipping unit 141-2, at the shipper's location or at any time prior to initiation of a consolidated shipment leg of the shipment. Where items being shipped by a number of different shippers are being consolidated, a shipper associated with shipper location 110a may consolidate one or more items being shipped by that shipper and one or more items shipped by another shipper (e.g., item 101-2 delivered to shipper location 110a by shipping service asset 120-1 from shipper location 110b), such as within a bag of shipping unit 141-1 and/or on a pallet of shipping unit 141-2, at shipper location 110a. Alternatively, a route driver associated with either or both of shipping service assets 120-5 and 120-6 may consolidate a plurality of items being shipped by different shippers (e.g., item 101-1 from a shipper associated with shipper location 110a and item 101-2 from a shipper associated with shipper location 110b delivered to shipper location 110a by shipping service asset 120-1), such as within a bag of shipping unit 141-1 and/or on a pallet of shipping unit 141-2, at shipper location 110a or at any time prior to initiation of a consolidated shipment leg of the shipment. As another example, items shipped by one or more shippers may be consolidated at a location separate from a shipper's location. For example, consolidation of shipped items from one or more shippers to form a shipping unit (e.g., either or both of shipping units 141-3 and 141-4) may be performed at service terminal location 130*a*, such as by personnel of the service terminal, a driver of either or both of shipping service assets 120-3 and 120-4, etc.

It should be appreciated that service terminal locations of embodiments herein may be associated with various different parties. For example, any or all of service terminals 130*a* through 130*d* may be associated with a shipping service provider providing transportation of shipped items in an origination leg of the shipment, a shipping service provider providing transportation of shipped items in a consolidated shipment leg of the shipment, or a third party to the shipment (e.g., a service provider associated with shipping consolidation management system 100A). Such service terminals may, for example, comprise a trucking terminal, a warehouse, a package service location (e.g., a UPS store, a pack and ship retail location, etc.), or the like. In some embodiments, a service terminal (e.g., service terminal location 130*a*) may comprise an automated or self-service terminal, such as a self-service kiosk wherein a shipper or a shipping service route driver (e.g., a route driver associated with shipping service assets 120-1 and/or 120-2) may deposit shipped items for consolidation into shipping units, such as by automated sorting machinery, by shipping service personnel (e.g., a route driver associated with any of shipping service assets 120-1 through 120-4), etc.

Shipping units comprising a plurality of shipped items of embodiments are transported in a consolidated shipping leg of a shipment by one or more shipping service provider from an initial location (e.g., shipper location 110*a* and/or service terminal location 130*a* of FIG. 1A) to a location appropriate (e.g., as determined by logic of consolidation management server system 160) to the delivery points for the items contained therein (e.g., service terminal locations 130*b* and/or 130*d*) for deconsolidation and delivery to the respective delivery points (e.g., delivery to any or all of delivery points 150*a* through 150*c* utilizing any or all of shipping service provider assets 120-11 through 120-14). The service terminal locations for deconsolidation may, for example, be selected based on their proximity to the delivery points for the items in the shipping unit, based upon shipping services available with respect to the service terminal locations, based upon costs for shipment of the items, etc.

In operation according to embodiments of the invention, one or more intermediary service terminal may be utilized with respect to a consolidated shipment leg of a shipment. For example, rather than a consolidated shipment leg proceeding directly from a shipper location or a service terminal location at which consolidation of items is performed (e.g., shipper location 110*a* or service terminal location 130*a*) to a service terminal location at which deconsolidation of the items is performed (e.g., service locations 130*b* or 130*d*), the consolidated shipment leg may include an intermediary service terminal location (e.g., service location 130*c*). Such an intermediary service terminal may be utilized to change shipping service providers, shipping service provider assets, shipping services, etc. with respect to a consolidated shipping leg of a shipment. Additionally or alternatively, such an intermediary service terminal may be utilized to further consolidate shipped items (e.g., adding one or more shipped items to a shipping unit, such as to facilitate further collection of shipped items en route) and/or partially deconsolidate a shipping unit (e.g., removing one or more shipped items from a shipping unit, such as to facilitate delivery of shipped items en route) to provide a reformed shipping unit (e.g., shipping unit 141-6'). On or more piece of consolidated shipment documentation (e.g., shipping labels, valid postage indicia, consolidated shipment shipping unit shipping labels, tracking number information, packing lists, manifests, hazardous cargo declarations, etc.) for use with respect to shipped items may be printed or altered at such an intermediary service location. For example, a shipping service provider (e.g., route driver personnel of shipping service assets 120-8 and/or 120-10, shipping service provider terminal or warehouse personnel of service terminal location 130*c*, etc.) may print (e.g., using printer functionality of, or associated with, respective ones of shipping service provider mobile devices 121-8 and/or 121-10 and/or printer 131*c*) a consolidated shipment shipping unit shipping label, or some portion thereof, for the reformed shipping unit.

Figure 2:
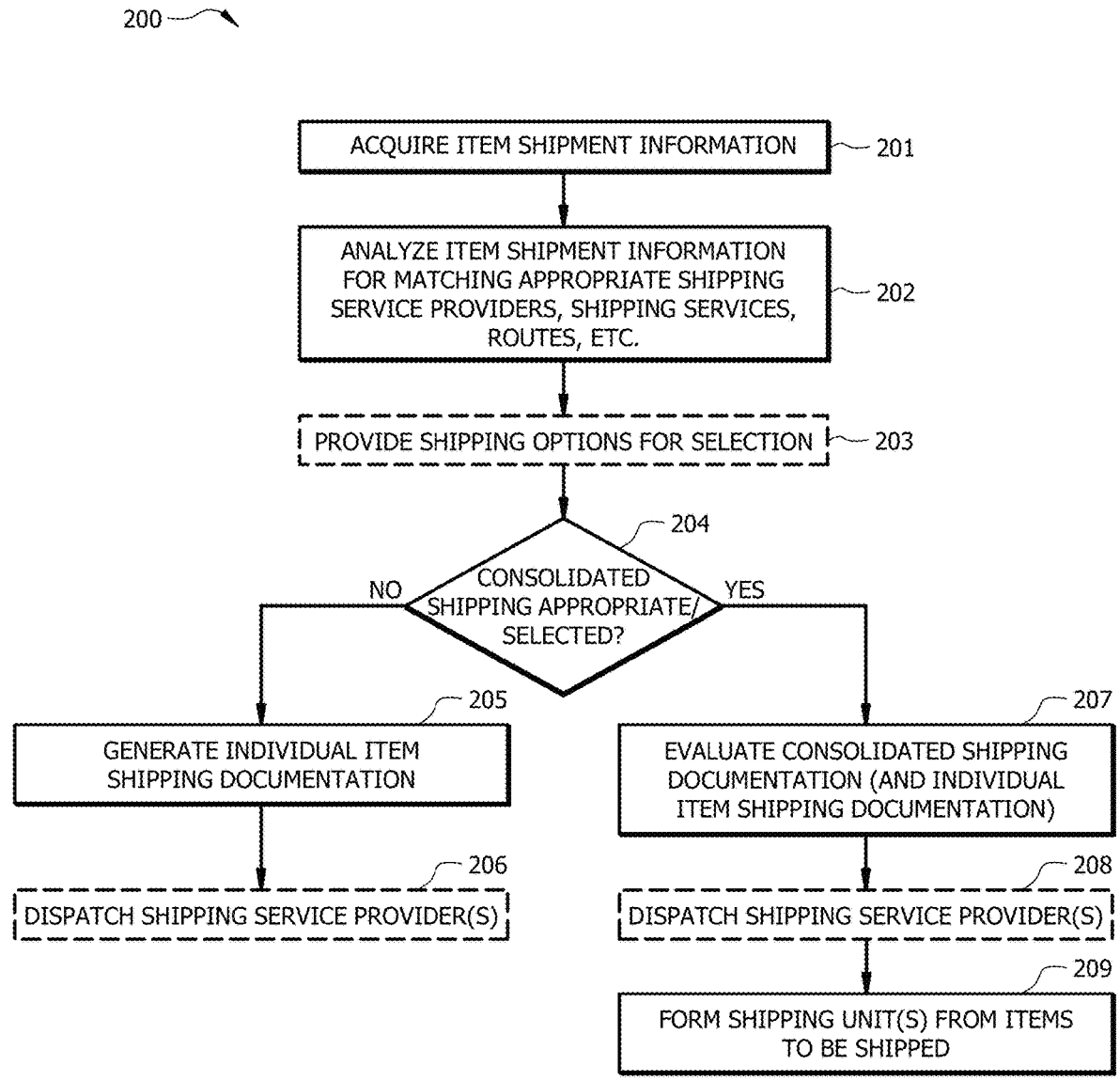
FIG. 2 shows operation of consolidation management systems in accordance with embodiments of the invention.

Having described exemplary configurations of shipping consolidation management systems 100A and 100B according to embodiments herein, operation of such shipping consolidation management systems is described with reference to the flow diagram of FIG. 2 below. Flow 200 of FIG. 2 shows exemplary operation providing shipping consolidation management with respect to items being shipped by one or more shippers.

Flow 200 of FIG. 2 will first be described with reference to an example wherein items being shipped by a single shipper are considered for consolidated shipping. In accordance with such an example, at block 201 of the embodiment illustrated in FIG. 2 information regarding items to be shipped is acquired. For example, shipper personnel may input information regarding item shipment at shipper computer system 111*a* of shipper location 110*a*. Such information may include information regarding the items to be shipped (e.g., size, weight, contents, packaging, etc.), information regarding the delivery points for the items to be shipped (e.g., recipient addresses, recipient address type, such as residential, business, loading dock, etc.), information regarding shipping services (e.g., desired delivery time, shipping service provider preference/selection, shipment tracking, delivery point signature required, special services requested, shipping service cost preference/selection, etc.), and/or the like. Information regarding item shipment may be obtained by shipper computer system 111*a* and/or consolidation management server system 160 from one or more sources in addition to or in the alternative to shipper input of such information. For example, logic of consolidation management server system 160 may interface with shipping resource server 180, such as may comprise one or more servers of one or more shipping service providers, to acquire information regarding suitable and/or available shipping services (e.g., information regarding shipping services that may be used for the particular shipped items, estimated or guaranteed transit times, services available from the shipping service provider, shipping rate information, shipping service provider drop off depot and/or shipping service provider pickup depot, etc.) with respect to items to be shipped. Moreover, consolidation management server system 160 may comprise one or more databases (not shown) from which logic of consolidation management server system 160 may obtain information regarding items to be shipped (e.g., using information input by shipper personnel to access one or more database and/or processing logic to acquire additional and/or related information). Irrespective of the particular source of the information regarding items to be shipped, such information is preferably provided to consolidation management server system 160 for use in shipping consolidation processing according to the concepts herein.

At block 202 of the illustrated embodiment, logic of consolidation management server system 160 operates to analyze the item shipment information for matching appropriate shipping service providers, shipping services, routes, etc. for the shipments. In operation according to embodiments, the analysis determines if there are sufficient volumes of items to be shipped to provide shipment consolidation. For example, a shipper may establish a threshold item number preference (e.g., a minimum number of items the shipper is willing to provide special handling for shipping consolidation, a number of items at which the shipper perceives a benefit from shipping consolidation, a number of items required for shipping consolidation by one or more shipping service providers used by the shipper, etc.) at or above which the shipper wishes shipping consolidation management system 100A to offer shipping consolidation, if otherwise appropriate. Such a threshold number of items may, for example, be selected by a shipper to be 20, 25, 30, etc. items. Additionally or alternatively, an administrator or operator of consolidation management server system 160 may establish a threshold item number (e.g., a number of items at which the shipper receives a cost benefit from shipping consolidation, a number of items required for shipping consolidation by one or more shipping service providers, etc.) at or above which logic of consolidation management system 100A performs analysis regarding the availability and/or appropriateness of shipping consolidation. Such a threshold number of items may, for example, be selected by a shipper to be 20, 25, 30, 40, 50, etc. items. It should be appreciated that the threshold number of items for shipment consolidation established by individual shippers and an operator or administrator of consolidation management server system 160 may be different (e.g., where consolidation of items from a plurality of shippers is provided for, the item number threshold implemented by consolidation management server system 160 may be greater than the item number threshold implemented by individual shippers and nevertheless groups of items may be established meeting the requisite thresholds).

In analyzing item shipment information in accordance with operation at block 202 of embodiments, logic of consolidation management server system 160 may determine groups of items being shipped to a same destination area (e.g., a same shipping region or zone, destinations within a threshold number of zones of one another, sharing the same first digits (such as 2 or 3 digits) of a postal delivery code (such as ZIP code)), sharing a route for one or more legs of the shipment, sharing a same shipping service provider drop off depot, sharing a same shipping service provider pickup depot, etc. Where one or more such groups of items to be shipped include sufficient items (e.g., a number of items meeting the aforementioned item number thresholds), the analysis provided by logic of consolidation management server system 160 may operate to determine the availability and/or appropriateness of shipping consolidation with respect to each group having sufficient numbers of items. For example, the services of a shipping service provider selected by or otherwise preferred by the shipper may be analyzed to determine if shipping consolidation is available from the shipping service provider or the services of the shipping service provider are compatible with shipping consolidation (e.g., the shipping service provider's origination leg shipping services and/or delivery leg shipping services may be utilized with another shipping service provider's services for a consolidated shipping leg of the shipment). Such analysis may additionally or alternatively include analysis of the potential routes, transit times, shipping services, etc. to determine if shipping consolidation may be implemented with respect to one or more leg of the shipment while meeting the shipment parameters requested by the shipper (e.g., delivery time, special services, etc.). Likewise, such analysis may additionally or alternatively include analysis of the costs (e.g., shipping service provider rates for each leg of a shipment with and without shipment consolidation) to determine if savings (e.g., a threshold minimum savings, savings associated with deferred payment options available using alternative shipping service providers for one or more legs, etc.) may be realized.

Embodiments of consolidation management server system 160 may utilize published rate tables and/or posted rate databases for determining the availability of consolidated shipping services, the services provided with respect to particular consolidated shipping services, the costs incurred using particular consolidated shipping services, etc. Additionally or alternatively, consolidation management server system 160 of embodiments may operate to communicate with shipping service providers with respect to consolidated shipping services. For example, logic of consolidation management server system 160 may solicit shipping services particulars (e.g., in the form of a web interface or other application facilitating input of relevant information, through an online reverse auction, etc.) from one or more shipping service provider (e.g., independent truck drivers, LTL trucking companies, etc.) with respect to particular shipments (e.g., a possible consolidated shipment leg for a particular shipment) to obtain information such as rates, services offered, transit time, depots served, etc. In operation according to embodiments, individual route drivers may utilize respective ones of shipping service provider mobile devices 121-4 through 121-6 and/or shipping service providers offering such services may utilize computing equipment (e.g., service terminal computer systems 131a through 131d) to provide such information in an effort to obtain the consolidated shipment(s).

Analysis of item shipment information for determining the availability and/or appropriateness of shipping consolidation with respect to items to be shipped according to embodiments is not limited to the item shipment information associated with items being presently shipped. For example, consolidation management server system 160 may comprise or be in communication with shipping services functionality (e.g., shipping resource server 180 providing shipment processing functionality, such as postage processing, packing slip generation, order management, order fulfilment processing, etc.) from which logic of consolidation management server system 160 may determine (or predict) item shipment by the shipper for some relevant period of time (e.g., a portion of a day, a day, multiple days, etc.) for which consolidation of items may be made for shipment. Information regarding preparation for shipping items as may be gleaned from such shipping service functionality may be utilized as shipment information for determining the availability and/or appropriateness of shipping consolidation according to embodiments.

As a specific example to aid in understanding operation for determining the availability and/or appropriateness of shipping consolidation with respect to items to be shipped according to embodiments, a shipper associated with shipper location 110a may have a number of items to be shipped (e.g., including item 101-1) for which the shipper inputs item shipment information to select a zone based shipping service product (e.g., USPS priority mail shipping services). Logic of consolidation management server system 160 may determine that a sufficient number (e.g., 20) of those items are destined for delivery points within a same zone (or a same region, such as an area within some number of zones within one another) or can otherwise share a portion of the shipping route (e.g., a same en route depot) and that a consolidated shipping option is available (e.g., a consolidated shipping service is available for the type of items being shipped, a consolidated shipping service is available for one or more legs of a route consistent with the desired shipment, a consolidated shipping service is compatible with an origination leg and/or delivery leg shipping service selected by the shipper, etc.) and appropriate (e.g., meets the shipper's item number threshold, results in cost savings, consistent with a delivery time requested by the shipper, etc.). A shipping service provider, such as a LTL trucking company, an independent truck driver, a package carrier (e.g., FEDEX, UPS, USPS, etc.) may, for example, offer bulk (e.g., pallet, large bag, etc.) shipping services between points consistent with a route for the shipment of items. As a specific example, the USPS may offer USPS priority mail express open and distribute shipping services to a USPS depot within a delivery zone for a group of items, whereby such items may be consolidated (e.g., nested in a bag or box, wrapped or otherwise incarcerated on a pallet, etc.) for at least a portion of the shipment (i.e., a consolidated shipment leg) from shipper location 110a to the delivery locations (e.g., recipient locations 150a through 150c of FIG. 1B, where those recipient locations are disposed in the same zone or otherwise meet criteria for consolidated shipment herein). The items may be deconsolidated at the end of the consolidated shipment leg (e.g., at a USPS depot in the destination zone) and individually provided delivery leg shipping services (e.g., given to USPS route carriers for delivery using an available shipping service, such as parcel select, priority mail, etc.

Having analyzed the item shipment information for matching appropriate shipping service providers, shipping services, routes, etc. for the shipments at block 202, embodiments of flow 200 proceed to block 203 wherein one or more shipping options are provided to the shipper for selection. For example, logic of consolidation management server system 160 may provide information regarding the shipping service provider(s), shipping service(s), cost(s), and available service(s) to shipper computer system 111a for review by shipper personnel. Where one or more alternatives are available, the personnel may indicate selection of a particular option (or possibly reject all options). Where no alternatives are available, the personnel may be provided with the shipping service provider, shipping service, cost, and available service information for informational purposes (or possibly to allow for rejection of the offering).

Block 203 of the illustrated embodiment is represented in dotted lines to illustrate omission of the functionality thereof according to alternative embodiments. For example, rather than providing the aforementioned information for selection/rejection by shipper personnel, embodiments herein may operate to autonomously select among available alternatives (e.g., to select least expensive options, to select options meeting all or most of the shipper's shipping criteria, to select options meeting requested delivery dates, etc.).

It should be appreciated that various different options may be provided with respect to different items to be shipped. For example, where a plurality of groups of items are established (e.g., groups destined for different delivery zones or regions, groups routed through different en route depots, groups to be provided consolidated shipping services by different shipping service providers, etc.), different options may be provided with respect to the shipment of any or all such groups (e.g., different options for origination legs, consolidated shipment legs, and/or delivery legs of the shipments as between the groups of items). Moreover, differences may be provided with regard to consolidated shipping availability for the items to be shipped by a shipper. For example, one or more items may be of a type (e.g., hazardous material, explosive device, flammable material, perishable item, etc.) not suitable for a consolidated shipment, may be destined for a delivery point which is not in a same zone or region as a sufficient number of other items to efficiently utilize consolidated shipping, etc., whereas other items may be utilized to establish one or more groups for consolidated shipping. Accordingly, one or more consolidated shipping alternative may be offered with respect to some items while shipping services that do not include consolidated shipping may be offered with respect to one or more other items.

At block 204 of the embodiment of flow 200 illustrated in FIG. 2 a determination regarding whether consolidated shipping is appropriate and/or selected is made. For example, where alternatives are presented to shipper personnel for selection at block 203, logic of consolidation management server system 160 may determine if a consolidated shipping option has been selected. Similarly, where one or more consolidated shipping option is determined to be applicable and an available alternative is autonomously selected, logic of consolidation management server system 160 may determine that consolidated shipping is appropriate.

If it is determined at block 204 that consolidated shipping is not appropriate and/or has not been selected (i.e., all the items are to be shipped without consolidated shipping), the illustrated embodiment of flow 200 proceeds to block 205 wherein shipping documentation for the individual items to be shipped is generated. For example, consolidation management server system 160 may facilitate shipper computer system 111a and/or shipping resource server 180 initiating operation to generate and/or print shipping labels, postage indicia, tracking number information, packing lists, manifests, hazardous cargo declarations, etc. for the items. In operation according to embodiments, shipping resource server 180 may comprise an Internet postage server system operable to print postage indicia acceptable to a shipping service provider (e.g., the USPS) for such items to be shipped. Shipper personnel may apply such documentation, or a portion thereof, to the respective items to prepare the items for shipment. Correspondingly, at block 206 of the illustrated embodiment, which is represented in dotted lines to illustrate omission of the functionality thereof according to alternative embodiments, logic of shipping consolidation management system 100A (e.g., logic of shipper computer system 111a, consolidation management server system 160, and/or shipping resource server 180) may operate to dispatch one or more shipping service provider for initiating shipment of the items. For example, notification of items having been prepared for shipment, possibly providing information regarding the items, shipping services, etc., may be provided to shipping service provider(s) and/or route driver(s), whereby one or more route drivers (e.g., a route driver of shipping service provider asset 120-2) may be instructed to pick up the items for shipment. Route drivers may, for example, be provided notification of individual items for pick up via an associated shipping service provider mobile device (e.g., shipping service provider mobile device 121-2).

However, if it is determined at block 204 that consolidated shipping is appropriate and/or has been selected with respect to the items (i.e., at least some portion of the items are to be shipped with consolidated shipping in one or more leg of the shipment), the illustrated embodiment of flow 200 proceeds to block 207 wherein appropriate shipping documentation for items to be shipped is generated. For example, consolidation management server system 160 may facilitate shipper computer system 111*a* and/or shipping resource server 180 initiating operation to generate and/or print consolidated shipment shipping unit shipping labels, tracking number information, packing lists, manifests, hazardous cargo declarations, etc.) for use with respect to consolidated shipment shipping units formed of item groups. Moreover, where consolidated shipping is not appropriate and/or has not been selected with respect to one or more items, consolidation management server system 160 may facilitate shipper computer system 111*a* and/or shipping resource server 180 initiating operation to generate and/or print shipping labels, postage indicia, tracking number information, packing lists, manifests, hazardous cargo declarations, etc. for such one or more items.

Shipping units of embodiments comprise consolidated shipment shipping unit shipping labels for use in transporting the shipping units in a consolidated shipping leg. Accordingly, shipping unit shipping labels 142-1 and 142-2 may be generated at block 207 of flow 200 for use with respective ones of shipping units 141-1 and 141-2 in a consolidated shipment leg of the shipment of their items. In operation according to embodiments, individual shipping labels for each item (e.g., shipping label 102-1 for item 101-1) may be generated for use in an origination leg and/or delivery leg of the shipment and applied to the respective items. Thereafter, the items of a group may be formed into a shipping unit and a shipping unit label applied thereto (e.g., shipping unit shipping label 142-1 for shipping unit 141-1 and shipping unit shipping label 142-2 for shipping unit 141-2). It should be appreciated that the individual item shipping labels (e.g., shipping label 102-1) and the shipping unit shipping labels (e.g., shipping unit shipping labels 142-1 and 142-2) may differ in a number of ways. For example, an individual item shipping label utilized with respect to the origination leg and/or delivery leg may include an origination address associated with the shipper and/or a destination address associated with the intended recipient and postage or other shipping services payment information associated with an origination leg and/or delivery leg of the shipment (e.g., the shipping services rate provided with respect to the shipping label may be based upon one or more zones of an origination leg in which the item is obtained from the shipper and at which the shipping unit is formed and/or one or more zones of a delivery leg in which the item is deconsolidated from the shipping unit and a zone at which the item is ultimately delivered). In contrast, a shipping unit shipping label may, for example, comprise an origination address or depot address at which the shipping unit is formed from consolidation of items and/or a depot address at which the shipping unit is deconsolidated and postage or other shipping services payment information associated with a consolidated shipping leg (e.g., the shipping services rate provided with respect to the shipping label may be based upon a route or distance for the consolidated shipping leg).

Operation to generate consolidated shipping documentation according to embodiments may include further analysis of the shipment information and/or the items identified for groups of items to be consolidated. For example, shipping service providers may place limits (e.g., limits on total weight, individual item size, aggregated item size, item count, etc.) upon shipping units for consolidated shipment and/or the containers (e.g., boxes, bags, pallets, etc.) used for consolidated shipment shipping units may have limits (e.g., physical limits on total weight, aggregated item size, item shape, etc.) associated therewith. Accordingly, logic of consolidation management server system 160 of embodiments operates to analyze groupings of items for identifying sub-groups of the items suitable for forming shipping units conforming to any limits placed thereon. The consolidated shipping documentation generated may include multiple shipping unit labels, each for a different shipping unit for a respective sub-group of items, for a same consolidated shipment leg. The individual shipping labels for each item of the sub-groups may identify the grouping of items (e.g., the destination depot for the shipping unit, the destination zone or region for the shipping unit, etc.) as well as including information to identify the particular shipping unit the item is to be part of Additionally or alternatively, the consolidated shipping documentation may include one or more packing list providing information regarding the particular shipping units items are to be part of.

To facilitate providing transparency with respect to the progress and status of the shipment of items in a consolidated shipment, embodiments herein provide for unified tracking information for the multiple shipment legs (e.g., origination leg, consolidated shipment leg, and/or delivery leg). For example, unified tracking information for the multiple leg shipment of a particular item may be linked to one or more tracking numbers for the individual shipment legs providing the shipping services for the item. Such unified tracking information may, for example, be printed on the shipping labels (e.g., shipped item shipping label 102-2 used for shipped item 101-2 and/or shipping unit shipping label 142-1, 142-2, or 142-3 used for respective ones of shipping units 141-1, 141-2, and 142-3 as may be used in consolidated shipment of item 101-2). Additionally or alternatively, embodiments store such unified tracking information in a database (e.g., a database of consolidation management server system 160) associating the unified tracking information with information (e.g., shipping service provider tracking information) for the multiple shipment legs provided with respect to the shipment of the item.

At block 208 of the illustrated embodiment, which is represented in dotted lines to illustrate omission of the functionality thereof according to alternative embodiments, logic of shipping consolidation management system 100A (e.g., logic of shipper computer system 111*a*, consolidation management server system 160, and/or shipping resource server 180) may operate to dispatch one or more shipping service provider for initiating shipment of the items. For example, notification of one or more groups of items for consolidated shipment, possibly providing information regarding the items, shipping services, etc., may be provided to shipping service provider(s) and/or route driver(s), whereby one or more route drivers (e.g., a route driver of shipping service provider assets 120-5 and 120-6) may be instructed to pick up groups of items for shipment. Further, notification of individual items having been prepared for shipment, possibly providing information regarding the items, shipping services, etc., may be provided to shipping service provider(s) and/or route driver(s), whereby one or more route drivers (e.g., a route driver of shipping service provider asset 120-2) may be instructed to pick up the items for shipment. Route drivers may, for example, be provided notification of items, whether individual items or groups of items, for pick up via an associated shipping service provider mobile device (e.g., shipping service provider mobile devices 121-2, 121-5 and 121-6).

Groups of items for consolidated shipment may be formed into a shipping unit at the shipper location (i.e., a consolidated shipment leg is initiated at the shipper location) by shipper personnel, by a route driver, etc. at block 209 of flow 200. For example, item shipping labels generated as part of the consolidated shipping documentation (e.g., shipping label 102-1 for item 101-1) may include information (e.g., destination depot identification, destination area identification, destination zone information, the first digits (such as 2 or 3 digits) of a postal delivery code, different color designators, sorting code information, etc.) facilitating sorting of the items into corresponding shipping units (e.g., items destined to a first zone or region to shipping unit 141-1 and items destined to a second zone or region to shipping unit 141-2), whereby shipper personnel, route drivers, etc. may nest the items of one or more respective groups in a bag or box, wrap or otherwise incarcerate the items of one or more respective groups on a pallet, etc. Accordingly, block 209 is shown in the illustrated embodiment after dispatching shipping service providers for the shipment to accommodate an instance where shipping service provider personnel (e.g., the aforementioned route drivers) may form the shipping units. It should be appreciated that where shipper personnel, or perhaps other personnel, form the shipping units for consolidated shipping, the functionality of block 209 may be performed prior to that of block 208 of the illustrated embodiment, if desired.

It should be appreciated that forming of shipping units for consolidated shipment herein is not limited to formation of shipping units at a shipper location and thus may be performed at any number of locations, such as at shipping service provider depots, third party locations, etc. For example, one or more shipping service provider assets (e.g., shipping service provider asset 120-2) may be dispatched to transport one or more items from the shipper location (i.e., an origination leg) to be later formed into a shipping unit (e.g., at an intermediary service terminal such as service terminal location 130a). The consolidated shipping documentation, or some portion thereof, (e.g., the aforementioned shipping unit shipping label) may be generated at the shipper location and/or at a location at which the shipping unit is formed according to embodiments herein.

Moreover, it should be appreciated that a consolidated shipment leg of embodiments may not terminate at or proceed directly to a zone or region near one or more intended recipients. For example, a shipping unit of a consolidated shipment of embodiments may terminate at an intermediary terminal (e.g., service terminal location 130c) for deconsolidation of one or more items. Such an intermediary terminal may be utilized to provide consolidated shipping for items sharing some portion of a shipping route, but which are not ultimately to be delivered to recipients that are disposed in relative close proximity to one another (e.g., recipients that are not disposed in a same zone or region). Additionally or alternatively, such an intermediary terminal may be utilized to consolidate shipping units, whereby a larger shipping unit is used for a portion of a consolidated shipment leg and the larger shipping unit is deconsolidated into a plurality of smaller shipping units for each of another consolidated shipment leg portion of their shipment. Likewise, such an intermediary terminal may be utilized to consolidate items en route for consolidated shipping in at least a portion of a consolidated shipment leg. The consolidated shipping documentation, or some portion thereof, (e.g., the aforementioned shipping unit shipping label) may be generated at the shipper location and/or at a location at which the shipping unit of a particular consolidated shipment leg is formed according to embodiments herein.

The shipping units of consolidated shipments are preferably routed to appropriate terminals for deconsolidation and delivery leg transportation of the items for delivery to an intended recipient at a delivery point. For example, service terminal locations 130b and 130d may be disposed in a same zone or region as the delivery points for the respective items thereof, whereby a consolidated shipment leg is directed to (e.g., indicated by information on shipping unit shipping labels 142-5 and 142-7) and terminated at each of those locations and the deconsolidation of the respective shipping units (e.g., shipping units 141-5 and 141-7) performed for initiating a delivery leg for the deconsolidated items (e.g., delivery leg transportation being provided by a respective one or more of shipping service provider assets 120-11 through 120-14). In operation according to embodiments, the individual items deconsolidated from a shipping unit have shipping labels thereon (e.g., shipping labels including the recipient location address and possibly including postage indicia or other means of payment for the delivery leg, as may have been applied to the item by the shipper, origination leg route driver, etc.) to facilitate shipping services of the delivery leg.

Continuing with the above specific example, wherein a consolidated shipment leg is provided using USPS priority mail express open and distribute shipping services, either or both of service terminal locations 130b and 130d may comprise a USPS depot within a delivery zone for a group of items. Such items may be deconsolidated (e.g., removed from a bag or box, unwrapped or otherwise freed from a pallet, etc.) for providing delivery leg shipping services (e.g., provided to USPS route carriers associated with any or all of shipping service provider assets 120-11 through 121-14) using an available shipping service, such as parcel select, priority mail, etc. Shipping labels provided on the individual items deconsolidated from a shipping unit may provide postage for the delivery leg portion of the shipment (e.g., although perhaps including the shipper address information and recipient address information, and having in fact been shipped from a location other than the USPS depot, an amount of postage thereon may be for local delivery from the USPS depot appropriate to a particular level of service being provided in for the delivery leg).

Having described operation in accordance with flow 200 of FIG. 2 with respect to an example wherein items being shipped by a single shipper are considered for consolidated shipping, operation in accordance with flow 200 is described below with respect to an exemplary embodiment wherein items being shipped by a plurality of shippers are considered for consolidated shipping. For example, items to be shipped by a shipper associated with shipper location 110a and a shipper associated with shipper location 110b may be considered for consolidated shipping according to the concepts herein. It should be appreciated that, although the illustrated embodiment shows two such shippers/shipper locations for simplicity, embodiments may operate to provide consolidation of items for shipment from any number of shippers and/or locations.

In accordance with a multiple shipper consolidated shipping example, at block 201 of the embodiment illustrated in FIG. 2 information regarding items to be shipped is acquired. As in the previous example, shipper personnel may input information regarding item shipment at shipper computer system 111a of shipper location 110a. Further, however, shipper personnel may likewise input information regarding item shipment at shipper computer system 111b of shipper location 110*b*. Additionally or alternatively, information regarding item shipment by one or more of the shippers may be obtained by shipper computer system 111*a*, shipper computer system 111*b*, and/or consolidation management server system 160 from one or more sources in addition to or in the alternative to shipper input of such information, as described in the previous example. Irrespective of the particular source of the information regarding items to be shipped, such information is preferably provided to consolidation management server system 160 for use in shipping consolidation processing according to the concepts herein.

At block 202 of the illustrated embodiment, logic of consolidation management server system 160 operates to analyze the item shipment information for matching appropriate shipping service providers, shipping services, routes, etc. for the shipments. In operation according to embodiments, the analysis determines if there are sufficient volumes of items to be shipped to provide shipment consolidation. In determining if there are sufficient volumes of items to be shipped to provide shipment consolidation, logic of consolidation management server system 160 analyzes various permutations of items to be shipped from the plurality of shippers to determine if items from multiple such shippers may be aggregated to facilitate shipment consolidation. For example, a first shipper may have a number of items being shipped to a same zone or region, but which are insufficient to provide for consolidated shipping (e.g., does not meet a minimum threshold number of items, does not provide a cost effective shipping unit, etc.). A second shipper may, however, have one or more items being shipped to the same zone or region, whereby if the one or more items from the second shipper are combined with the items from the first shipper the combination of items is sufficient to provide for consolidated shipping. Such a second shipper, providing items for consolidation with one or more other shippers (e.g., the first shipper), may be disposed relatively near the other shippers (e.g., in a same zone or region, within a same commercial district, within a same city, at a location that uses a same shipping service provider depot for an origination leg of a shipment, etc.) to facilitate the consolidation of items. Such a second shipper, however, need not be disposed near other shippers for consolidation of items according to embodiments. For example, items may be consolidated en route, such as for one or more consolidated shipment legs provided after the origination legs of a shipment (e.g., where items are formed into shipping units at intermediary service terminals in the routes of shipments). Likewise, the items consolidated need not be destined to a same delivery zone or region, but instead may share some portion of their shipping routes sufficient for consolidated shipping according to embodiments.

As with the single shipper example above, an administrator or operator of consolidation management server system 160 may establish a threshold item number (e.g., a number of items at which the shipper receives a cost benefit from shipping consolidation, a number of items required for shipping consolidation by one or more shipping service providers, etc.) at or above which logic of consolidation management system 100A performs analysis regarding the availability and/or appropriateness of shipping consolidation. Likewise, similar to the single shipper example above, shippers in a multiple shipper consolidated shipping implementation may establish threshold item number preferences (e.g., a minimum number of items the shipper is willing to provide special handling for shipping consolidation, a number of items at which the shipper perceives a benefit from shipping consolidation, a number of items required for shipping consolidation by one or more shipping service providers used by the shipper, etc.) at or above which the shipper wishes shipping consolidation management system 100A to offer shipping consolidation, if otherwise appropriate. Such thresholds may be different for any particular shipper, and shippers having different such different threshold numbers of items may nevertheless have their items consolidated in a same shipping unit. Further, the threshold number of items for shipment consolidation established by the shippers and an operator or administrator of consolidation management server system 160 may be different.

In analyzing item shipment information in accordance with operation at block 202 of embodiments, logic of consolidation management server system 160 may determine groups of items being shipped by one or more shipper to a same destination area (e.g., a same shipping region or zone, destinations within a threshold number of zones of one another, sharing the same first digits (such as 2 or 3 digits) of a postal delivery code (such as ZIP code)), sharing a route for one or more legs of the shipment, sharing a same shipping service provider drop off depot, sharing a same shipping service provider pickup depot, etc. Where one or more such groups of items (e.g., groups of items including a plurality of items from one or more different shippers) to be shipped include sufficient items (e.g., a number of items meeting the aforementioned item number thresholds), the analysis provided by logic of consolidation management server system 160 may operate to determine the availability and/or appropriateness of shipping consolidation with respect to each group having sufficient numbers of items. For example, the services of a shipping service provider selected by or otherwise preferred by the shippers of items of a group may be analyzed to determine if shipping consolidation is available from the shipping service provider or the services of the shipping service provider are compatible with shipping consolidation (e.g., the shipping service provider's origination leg shipping services and/or delivery leg shipping services may be utilized with another shipping service provider's services for a consolidated shipping leg of the shipment). Such analysis may additionally or alternatively include analysis of the potential routes, transit times, shipping services, etc. to determine if shipping consolidation may be implemented with respect to one or more leg of the shipment while meeting the shipment parameters (e.g., delivery time, special services, etc.) requested by the shippers of items in the group. Likewise, such analysis may additionally or alternatively include analysis of the costs (e.g., shipping service provider rates for each leg of a shipment with and without shipment consolidation) to determine if savings (e.g., a threshold minimum savings, savings associated with deferred payment options available using alternative shipping service providers for one or more legs, etc.) may be realized. Additionally or alternatively, information regarding preparation for shipping items as may be gleaned from various shipping service functionality (e.g., shipping resource server 180 providing shipment processing functionality, such as postage processing, packing slip generation, order management, order fulfilment processing, etc.) may be utilized as shipment information for determining the availability and/or appropriateness of shipping consolidation according to embodiments.

As with the single shipper example above, embodiments of consolidation management server system 160 in a multiple shipper implementation may utilize published rate tables, posted rate databases, and/or communication with shipping service providers for determining the availability of consolidated shipping services, the services provided with respect to particular consolidated shipping services, the costs incurred using particular consolidated shipping services, etc. Accordingly, logic of consolidation management server system 160 may solicit shipping services particulars (e.g., in the form of a web interface or other application facilitating input of relevant information, through an online reverse auction, etc.) from one or more shipping service provider (e.g., independent truck drivers, LTL trucking companies, etc.) with respect to particular shipments (e.g., a possible consolidated shipment leg for a particular shipment) to obtain information such as rates, services offered, transit time, depots served, etc.

As a specific example to aid in understanding operation for determining the availability and/or appropriateness of shipping consolidation with respect to items to be shipped according to embodiments, a shipper associated with shipper location 110*a* may have a number of items to be shipped (e.g., including item 101-1) for which the shipper inputs item shipment information to select a zone based shipping service product (e.g., USPS priority mail shipping services). However, the items to be shipped by the shipper associated with shipper location 110*a* may not be sufficient to support a consolidated shipment (e.g., the number of items may be insufficient to meet one or more thresholds for a consolidated shipment, the items of a particular group may not aggregate to facilitate cost effective consolidated shipment, etc.). However, a shipper associated with shipper location 110*b* may have one or more items to be shipped (e.g., including item 101-2) for which the shipper inputs item shipment information to select a zone based shipping service product (e.g., USPS priority mail shipping services). Accordingly, logic of consolidation management server system 160 may determine that a sufficient number (e.g., 20) of items from shipper location 110*a* and shipper location 110*b* are destined for delivery points within a same zone (or a same region, such as an area within some number of zones within one another) or can otherwise share a portion of the shipping route (e.g., a same en route depot) and that a consolidated shipping option is available (e.g., a consolidated shipping service is available for the type of items being shipped, a consolidated shipping service is available for one or more legs of a route consistent with the desired shipment, a consolidated shipping service is compatible with an origination leg and/or delivery leg shipping service selected by the shipper, etc.) and appropriate (e.g., meets the shippers' item number thresholds, results in cost savings, consistent with a delivery time requested by the shippers, etc.). For example, the USPS may offer USPS priority mail express open and distribute shipping services to a USPS depot within a delivery zone for a group of items comprising items from both shipper location 110*a* and shipper location 110*b*, whereby such items may be consolidated (e.g., nested in a bag or box, wrapped or otherwise incarcerated on a pallet, etc.) for at least a portion of the shipment (i.e., a consolidated shipment leg). The items may be deconsolidated at the end of the consolidated shipment leg (e.g., at a USPS depot in the destination zone) and individually provided delivery leg shipping services (e.g., given to USPS route carriers for delivery using an available shipping service, such as parcel select, priority mail, etc.

Having analyzed the item shipment information for matching appropriate shipping service providers, shipping services, routes, etc. for the shipments at block 202, embodiments of flow 200 proceed to block 203 wherein one or more shipping options are provided to the shipper(s) for selection. For example, logic of consolidation management server system 160 may provide information regarding the shipping service provider(s), shipping service(s), cost(s), and available service(s) with respect to items (e.g., item 101-1) to be shipped from shipper location 110*a* to shipper computer system 111*a* for review by associated shipper personnel and provide information regarding the shipping service provider(s), shipping service(s), cost(s), and available service(s) with respect to items (e.g., item 101-2) to be shipped from shipper location 110*b* to shipper computer system 111*b* for review by associated shipper personnel. It should be appreciated that, where items from these multiple shippers are to be consolidated, information provided to each of shipper computer system 111*a* and shipper computer system 111*b* may comprise portions of the same information with respect to a consolidated shipment leg. Where one or more alternatives are available, the personnel of either or both shipper locations may indicate selection of a particular option (or possibly reject all options). Where no alternatives are available, the personnel of either or both shipper locations may be provided with the shipping service provider, shipping service, cost, and available service information for informational purposes (or possibly to allow for rejection of the offering).

It should be appreciated that various different options may be provided with respect to different items to be shipped. For example, where a plurality of groups of items are established (e.g., groups destined for different delivery zones or regions, groups routed through different en route depots, groups to be provided consolidated shipping services by different shipping service providers, etc.), different options may be provided with respect to the shipment of any or all such groups (e.g., different options for origination legs, consolidated shipment legs, and/or delivery legs of the shipments as between the groups of items), possibly including options with respect to provide groups for consolidated shipment with and/or without consolidating with items from another shipper. Moreover, differences may be provided with regard to consolidated shipping availability for the items to be shipped by the shippers. For example, one or more items may be of a type (e.g., hazardous material, explosive device, flammable material, perishable item, etc.) not suitable for a consolidated shipment, may be destined for a delivery point which is not in a same zone or region as a sufficient number of other items to efficiently utilize consolidated shipping, etc., whereas other items may be utilized to establish one or more groups for consolidated shipping. Accordingly, one or more consolidated shipping alternative may be offered with respect to some items while shipping services that do not include consolidated shipping may be offered with respect to one or more other items.

At block 204 of the embodiment of flow 200 illustrated in FIG. 2 a determination regarding whether consolidated shipping is appropriate and/or selected is made. For example, where alternatives are presented to shipper personnel for selection at block 203, logic of consolidation management server system 160 may determine if a consolidated shipping option has been selected with respect to either shipper. Similarly, where one or more consolidated shipping option is determined to be applicable and an available alternative is autonomously selected, logic of consolidation management server system 160 may determine that consolidated shipping is appropriate.

If it is determined at block 204 that consolidated shipping is not appropriate and/or has not been selected by a particular shipper (i.e., all the items for a particular shipper are to be shipped without consolidated shipping), the illustrated embodiment of flow 200 proceeds to block 205 wherein shipping documentation for the individual items to be shipped by that shipper is generated. For example, as described above with respect to the single shipper example, consolidation management server system 160 may facilitate shipper computer system 111a and/or shipping resource server 180 initiating operation to generate and/or print shipping labels, postage indicia, tracking number information, packing lists, manifests, hazardous cargo declarations, etc. for the items. At block 206 of the illustrated embodiment logic of shipping consolidation management system 100A (e.g., logic of the respective shipper computer system, consolidation management server system 160, and/or shipping resource server 180) may operate to dispatch one or more shipping service provider for initiating shipment of the items from the shipper location.

If it is determined at block 204 that consolidated shipping is appropriate and/or has been selected with respect to the items to be shipped by one or more shipper (i.e., at least some portion of the items are to be shipped with consolidated shipping in one or more leg of the shipment), the illustrated embodiment of flow 200 proceeds to block 207 wherein appropriate shipping documentation for items to be shipped is generated. For example, as described above with respect to the single shipper example, consolidation management server system 160 may facilitate shipper computer system 111a, shipper computer system 111b, and/or shipping resource server 180 initiating operation to generate and/or print consolidated shipment shipping unit shipping labels, tracking number information, packing lists, manifests, hazardous cargo declarations, etc.) for use with respect to consolidated shipment shipping units formed of item groups. Where items are to be consolidated from multiple shippers, any or all such shippers may provide for the generation of consolidated shipment documentation. For example, individual shipping labels may be printed by the shippers for their respective items, wherein the individual shipping labels include information identifying item consolidation groups for use in forming shipping units with respect to some portion of the shipment routes. Consolidated shipment shipping unit shipping labels may, for example, be printed by a particular shipper at which shipper location the items are consolidated to form a shipping unit, by all shippers having items to be consolidated (e.g., to identify the items for consolidation, for use in later consolidation of the items to form shipping units, etc.). Moreover, where consolidated shipping is not appropriate and/or has not been selected with respect to one or more items, consolidation management server system 160 may facilitate shipper computer system 111a, shipper computer system 111b, and/or shipping resource server 180 initiating operation to generate and/or print shipping labels, postage indicia, tracking number information, packing lists, manifests, hazardous cargo declarations, etc. for such one or more items.

Shipping units of embodiments comprise consolidated shipment shipping unit shipping labels for use in transporting the shipping units in a consolidated shipping leg. Accordingly, shipping unit shipping labels 142-1 and 142-2 may be generated at block 207 of flow 200 for use with respective ones of shipping units 141-1 and 141-2 in a consolidated shipment leg of the shipment of their items. In operation according to embodiments, individual shipping labels for each item (e.g., shipping label 102-1 for item 101-1 and shipping label 102-2 for item 101-2) may be generated for use in an origination leg and/or delivery leg of the shipment and applied to the respective items. Thereafter, the items of a group may be formed into a shipping unit and a shipping unit label applied thereto (e.g., shipping unit shipping label 142-1 for shipping unit 141-1 and shipping unit shipping label 142-2 for shipping unit 141-2). As in the single shipper example, the individual item shipping labels (e.g., shipping labels 102-1 and 102-2) and the shipping unit shipping labels (e.g., shipping unit shipping labels 142-1 and 142-2) may differ in a number of ways. For example, an individual item shipping label utilized with respect to the origination leg and/or delivery leg may include an origination address associated with the shipper and/or a destination address associated with the intended recipient and postage or other shipping services payment information associated with an origination leg and/or delivery leg of the shipment, whereas, a shipping unit shipping label may comprise an origination address or depot address at which the shipping unit is formed from consolidation of items and/or a depot address at which the shipping unit is deconsolidated and postage or other shipping services payment information associated with a consolidated shipping leg.

In operation according to embodiments, various groups of items for consolidation may be identified at block 202, wherein such groups may include items shipped from a plurality of shippers provided with an option to select consolidated shipping alternatives at block 203. Accordingly, a situation may arise wherein a group of items for consolidated shipping may no longer be viable (e.g., not meeting a minimum threshold, not being cost effective, etc.) where one or more shipper elects not to use consolidated shipping with respect to one or more item. Accordingly, operation at block 204 of embodiments to determine if consolidated shipping is appropriate may include analysis (e.g., similar to that described above with respect to operation at block 202) of item groupings remaining after shipper selections have been made. Where items formerly of a group for which consolidated shipping was appropriate, may thus be determined to no longer be appropriate for consolidated shipping after such shipper selections, and thus may be processed for individual item shipment at block 205 or 207.

Operation to generate consolidated shipping documentation according to embodiments may include further analysis of the shipment information and/or the items identified for groups of items to be consolidated. For example, shipping service providers may place limits (e.g., limits on total weight, individual item size, aggregated item size, item count, etc.) upon shipping units for consolidated shipment and/or the containers (e.g., boxes, bags, pallets, etc.) used for consolidated shipment shipping units may have limits (e.g., physical limits on total weight, aggregated item size, item shape, etc.) associated therewith. Accordingly, logic of consolidation management server system 160 of embodiments operates to analyze groupings of items for identifying subgroups of the items suitable for forming shipping units conforming to any limits placed thereon. As with the single shipper example, able, the consolidated shipping documentation generated may include multiple shipping unit labels for a same consolidated shipment leg and the individual shipping labels for each item of the sub-groups may identify the grouping of items as well as include information to identify the particular shipping unit the item is to be part of. Additionally or alternatively, the consolidated shipping documentation may include one or more packing list providing information regarding the particular shipping units items are to be part of.

It should be appreciated that embodiments providing for consolidation of items shipped by multiple shippers may provide for unified tracking information for the multiple shipment legs, as discussed above with respect to single shipper examples. Accordingly, unified tracking information for the multiple leg shipment may be linked to one or more tracking numbers for the individual shipment legs.

At block 208 of the illustrated embodiment logic of shipping consolidation management system 100A (e.g., logic of shipper computer system 111a, shipper computer system 111b, consolidation management server system 160, and/or shipping resource server 180) may operate to dispatch one or more shipping service provider for initiating shipment of the items. For example, as discussed above with respect to the single shipper example, notification of one or more groups of items for consolidated shipment, possibly providing information regarding the items, shipping services, etc., may be provided to shipping service provider(s) and/or route driver(s), whereby one or more route drivers (e.g., a route driver of shipping service provider assets 120-5 and 120-6) may be instructed to pick up groups of items for shipment. Further, notification of individual items having been prepared for shipment, possibly providing information regarding the items, shipping services, etc., may be provided to shipping service provider(s) and/or route driver(s), whereby one or more route drivers (e.g., a route driver of shipping service provider asset 120-2) may be instructed to pick up the items for shipment.

In providing consolidated shipping according to embodiments, items may be routed to a location for forming appropriate shipping groups. For example, in the case of the shipper associated with shipper location 110a having a plurality of items being shipped to a same zone or region and a shipper associated with shipper location 110b having one or more items being shipped to the same zone or region, the one or more items being shipped from shipper location 110b may be transported to shipper location 110a for consolidation with the items being shipped from shipper location 110a (e.g., to facilitate consolidated shipping where the items shipped from shipper location 110a and/or shipper location 110b are insufficient to provide for consolidated shipping). Where shipper location 110b is disposed relatively near one or more of the other shippers (e.g., in a same zone or region, within a same commercial district, within a same city, at a location that uses a same shipping service provider depot for an origination leg of a shipment, etc.), embodiments may utilize service providers not traditionally considered as shipping service providers, such as freelance drivers (e.g., drivers of the UBER transportation service), cab drivers, local delivery truck (e.g., furniture and appliance delivery, household moving van, etc.) drivers, etc. to provide transportation of items from shipper location 110b to another of the shipper locations (e.g., shipper location 110a) to facilitate the consolidation of items. Drivers (e.g., a driver of shipping service provider asset 120-1 operating in the area of shipper location 110b) for such non-traditional shipping service providers (also referred to herein as "route drivers") may be provided notification of items, whether individual items or groups of items, for pick up via an associated shipping service provider mobile device (e.g., shipping service provider mobile device 121-1). For example, a real-time driver dispatch application, such as that utilized by drivers of the UBER transportation service, may be utilized for dispatching such route drivers according to embodiments. Additionally or alternatively, shipping service providers and/or route drivers for providing such transportation of items, as well as transportation of items in any leg of a shipment, may be obtained according to embodiments by providing shipping services particulars (e.g., through a web interface or other application, through an online reverse auction, etc.) and allowing such shipping service providers and/or route drivers to vie for providing the service.

Irrespective of how they are dispatched, it should be appreciated that such non-traditional shipping service route drivers are not limited to providing transportation of items from a shipper location to another shipper location. For example, such route drivers may provide transportation of one or more items from a shipper location to a depot (e.g., service terminal location 130a) at which consolidation of items to form a shipping unit is performed (e.g., where items are consolidated en route, such as for one or more consolidated shipment legs provided after the origination legs of a shipment). Further, route drivers (e.g., route drivers for traditional shipping service providers, such as route drivers for USPS, UPS, FedEx, DHL, local and regional couriers, trucking companies providing TL services, trucking companies providing LTL services, and/or the like may be utilized with respect to any portion of a shipment, including providing transportation of items from a shipper location to another shipper location for consolidating items to form shipping units. It should be appreciated that forming of shipping units for consolidated shipment herein is not limited to formation of shipping units at a shipper location and thus may be performed at any number of locations, such as at shipping service provider depots, third party locations, etc. For example, one or more shipping service provider assets (e.g., shipping service provider assets 120-1 and 120-2) may be dispatched to transport one or more items from various shipper locations (e.g., providing origination legs from shipper location 110a and shipper location 110b) to be later formed into a shipping unit (e.g., at an intermediary service terminal such as service terminal location 130a). The consolidated shipping documentation, or some portion thereof, (e.g., the aforementioned shipping unit shipping label) may be generated at one or more of the shipper locations and/or at the locations at which the shipping unit is formed according to embodiments herein.

From the foregoing it can be appreciated that, as with the single shipping example, groups of items for consolidated shipment may be formed into a shipping unit at a shipper location (e.g., a consolidated shipment leg is initiated at a shipper location of a plurality of shippers from which items are consolidated) and/or at other locations, such as at a shipping service provider depot (e.g., at a shipping service provider terminal or warehouse or in a shipping service provider vehicle), or at a third party location (e.g., at a package service location, a shipping consolidation management provider location, or at a self-service kiosk), etc. Such shipping units may be formed by shipper personnel, by a route driver, shipping service personnel, third party personnel, etc. at block 209 of flow 200 of embodiments. For example, item shipping labels generated as part of the consolidated shipping documentation (e.g., shipping label 102-1 for item 101-1 and shipping label 102-2 for item 101-2) may include information (e.g., destination depot identification, destination area identification, destination zone information, the first digits (such as 2 or 3 digits) of a postal delivery code, different color designators, sorting code information, etc.) facilitating sorting of the items into corresponding shipping units (e.g., items destined to a first zone or region to shipping unit 141-1 and items destined to a second zone or region to shipping unit 141-2), whereby the personnel may nest the items of one or more respective groups in a bag or box, wrap or otherwise incarcerate the items of one or more respective groups on a pallet, etc.

Moreover, it should be appreciated that the a consolidated shipment leg of embodiments may not terminate at or proceed directly to a zone or region near one or more intended recipients. As with the single shipper example above, a shipping unit of a consolidated shipment of embodiments may terminate at an intermediary terminal (e.g., service terminal location 130c) for deconsolidation of one or more items, wherein such an intermediary terminal may be utilized to provide consolidated shipping for items sharing some portion of a shipping route. Such an intermediary terminal may additionally or alternatively be utilized to consolidate shipping units, whereby a larger shipping unit is used for a portion of a consolidated shipment leg and the larger shipping unit is deconsolidated into a plurality of smaller shipping units for each of another consolidated shipment leg portion of their shipment. Likewise, such an intermediary terminal may be utilized to consolidate items en route for consolidated shipping in at least a portion of a consolidated shipment leg. The consolidated shipping documentation, or some portion thereof, (e.g., the aforementioned shipping unit shipping label) may be generated at one or more of the shipper locations and/or at a location at which the shipping unit of a particular consolidated shipment leg is formed according to embodiments herein.

The shipping units of consolidated shipments of a multiple shipper implementation are preferably routed to appropriate terminals for deconsolidation and delivery leg transportation of the items for delivery to an intended recipient at a delivery point. For example, service terminal locations 130b and 130d may be disposed in a same zone or region as the delivery points for the respective items thereof, whereby a consolidated shipment leg is directed to (e.g., indicated by information on shipping unit shipping labels 142-5 and 142-7) and terminated at each of those locations and the deconsolidation of the respective shipping units (e.g., shipping units 141-5 and 141-7) performed for initiating a delivery leg for the deconsolidated items (e.g., delivery leg transportation being provided by a respective one or more of shipping service provider assets 120-11 through 120-14). In operation according to embodiments, the individual items deconsolidated from a shipping unit have shipping labels thereon (e.g., shipping labels including the recipient location address and possibly including postage indicia or other means of payment for the delivery leg, as may have been applied to the item by the shipper, origination leg route driver, etc.) to facilitate shipping services of the delivery leg.

Continuing with the above specific example, wherein a consolidated shipment leg is provided using USPS priority mail express open and distribute shipping services, either or both of service terminal locations 130b and 130d may comprise a USPS depot within a delivery zone for a group of items. Such items may be deconsolidated (e.g., removed from a bag or box, unwrapped or otherwise freed from a pallet, etc.) for providing delivery leg shipping services (e.g., provided to USPS route carriers associated with any or all of shipping service provider assets 120-11 through 121-14) using an available shipping service, such as parcel select, priority mail, etc. Shipping labels provided on the individual items deconsolidated from a shipping unit may provide postage for the delivery leg portion of the shipment (e.g., although perhaps including the shipper address information and recipient address information, and having in fact been shipped from a location other than the USPS depot, an amount of postage thereon may be for local delivery from the USPS depot appropriate to a particular level of service being provided in for the delivery leg).

As another specific example, in addition to or in the alternative to using traditional shipping service providers to provide delivery of items (e.g., the above described USPS route carriers), embodiments herein may utilize non-traditional shipping service providers for transporting items in a delivery leg. Where one or more of recipient locations 150a through 150c are disposed relatively near a corresponding terminal used for deconsolidation of items for delivery, such as service terminal location 130b or service terminal location 130d, (e.g., in a same zone or region, within a same commercial district, within a same city, at a location that uses a same shipping service provider depot for an origination leg of a shipment, etc.), embodiments may utilize freelance drivers (e.g., drivers of the UBER transportation service), cab drivers, local delivery truck (e.g., furniture and appliance delivery, household moving van, etc.) drivers, etc. to provide transportation of items from a depot to a recipient location. Route drivers (e.g., a driver of shipping service provider asset 120-11 operating in the area of service terminal location 130b and/or a driver of shipping service provider asset 120-13 operating in the area of service terminal location 130d) for such non-traditional shipping service providers may be provided notification of items, whether individual items or groups of items, for pick up via an associated shipping service provider mobile device (e.g., shipping service provider mobile devices 121-11 and 121-13). For example, a real-time driver dispatch application, such as that utilized by drivers of the LIBER transportation service, may be utilized for dispatching such route drivers according to embodiments.

It can be appreciated from the foregoing multiple shipper example that relatively small shippers or shippers that otherwise have low volume (or low volume shipped to any particular region, zone, etc.) may be provided consolidated shipping services. Such consolidated shipping may provide such shippers with discounted rates, shipping services, etc. that might otherwise not be available to the shipper and/or with respect to the items shipped by the shippers. Even where a single shipper has sufficient volume to qualify for consolidated shipping, embodiments herein provide for operation to determine groupings of items that may be consolidated for shipping, shipping service providers that may be used for the consolidated shipping, etc., as well as to provide for generation of consolidated shipping documentation to facilitate a shipper's use of consolidated shipping.

Moreover, the unified tracking information provided according to embodiments for the multiple shipment legs (e.g., origination leg, consolidated shipment leg, and/or delivery leg) may provide tracking information previously not available or practical with respect to items shipped between the shippers and recipients. For example, the applications utilized with respect to route drivers, such as may primarily be deployed to facilitate dispatching route drivers in an origination leg or a delivery leg, may be utilized to provide real-time tracking information with respect to items transported by a respective route driver. In operation according to embodiments, a universal tracking number associated with items entrusted to a particular route driver may be utilized with location information reported by a shipping service provider mobile device possessed by the route driver under control of the aforementioned application to provide real-time tracking of the item. Additionally or alternatively, scans of barcodes, radio frequency identification (RFID) tags, etc., such as by route drivers, at service terminal locations, etc., may be utilized with the aforementioned universal tracking information to provide robust tracking information with respect to items. Similarly, satellite tracking devices (e.g., global positioning system (GPS) transponder devices), such as may be attached to individual items and/or shipping units of consolidated items, may be monitored to provide robust tracking information according to embodiments.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   receiving, by a consolidation management server, from shipper computer systems of a plurality of shippers located at different physical locations, item shipment information for items to be shipped by the plurality of shippers from the different physical locations;
   assigning, by the consolidation management server, unified tracking information to an item to be shipped via a multiple leg shipment, wherein the multiple leg shipment includes a consolidated shipment leg and at least one non-consolidated shipment leg, wherein the item is to be consolidated with a group of items as a shipping unit for shipping services of the consolidated shipment leg, and wherein the item is not consolidated with the group of items for shipping services of the at least one non-consolidated shipment leg;
   storing, by the consolidation management server, the unified tracking information in a database accessible by the consolidation management server for periodic updating of the unified tracking information;
   associating, by the consolidation management server, a first tracking number for the item with respect to the at least one non-consolidated shipment leg with the unified tracking information, wherein the first tracking number includes first tracking data configured to track the item with respect to the at least one non-consolidated shipment leg but not with respect to each shipment leg of the multiple leg shipment;
   associating, by the consolidation management server, a second tracking number for the item with respect to the consolidated shipment leg with the unified tracking information, wherein the second tracking number includes second tracking data configured to track the item with respect to the consolidated shipment leg but not with respect to each shipment leg of the multiple leg shipment; and
   updating, by the consolidation management server, the unified tracking information in response to at least one of a first event reported with respect to the first tracking number and a second event reported with respect to the second tracking number so that the unified tracking information continues to accurately track the multiple leg shipment, wherein the unified tracking information is configured to provide accurate tracking of the multiple leg shipment, and wherein updating the unified tracking information comprises:
   identifying, by the consolidation management server, that the first tracking data is inaccurate with respect to the consolidated shipment leg but accurate with respect to the non-consolidated shipment leg, that the second tracking data is inaccurate with respect to the non-consolidated shipment leg but accurate with respect to the consolidated shipment leg, or that the first tracking data is inaccurate with respect to the consolidated shipping leg but accurate with respect to the non-consolidated shipment leg and that the second tracking data is inaccurate with respect to the non-consolidated shipment leg but accurate with respect to the consolidated shipment leg; and
   manipulating, by the consolidation management server, the first tracking data and the second tracking data to generate the unified tracking information, wherein the unified tracking information is further configured to homogenize a formatting of shipment information received from multiple shipment legs from different shipment service providers.

2. The method of claim 1, wherein the first event reported with respect to the first tracking number comprises an event reported by an interactive driver mobile app utilized by a route driver of a shipping service provider providing shipping services for the item in the at least one non-consolidated shipment leg.

3. The method of claim 2, wherein the first event comprises delivery of the item to an intermediate location.

4. The method of claim 1, wherein the second event reported with respect to the second tracking number comprises a scan event for the shipping unit performed by a consolidated shipping service provider.

5. The method of claim 1, wherein the second event comprises consolidation of the item with the group of items as the shipping unit for shipping services of the consolidated shipment leg.

6. The method of claim 1, further comprising:
   after the updating the unified tracking information, providing the unified tracking information for the item, wherein the unified tracking information accurately reflects a shipment status of the item for each leg of the multiple leg shipment.

7. The method of claim 1, wherein the non-consolidated shipment leg comprises a shipment leg selected from the group consisting of an origination leg and a delivery leg.

8. The method of claim 1, further comprising:
   generating a first shipping label for use in shipping services provided with respect to the item in the at least one non-consolidated shipment leg, wherein the first shipping label includes the first tracking number.

9. The method of claim 8, further comprising:
   generating a second shipping label for use in shipping services provided with respect to the shipping unit including the item in the consolidated shipment leg, wherein the second shipping label includes the second tracking number.

10. A consolidation management server system configured to maintain and update unified tracking information associated with shipment of an item, the consolidation management server system comprising:
    a memory; and
    at least one processor coupled to the memory, wherein the at least one processor is configured to:
    store the unified tracking information in a database, wherein the unified tracking information is configured to accurately track the item for each shipment leg of a multiple leg shipment;

associate the unified tracking information with first tracking data corresponding to at least a first shipment leg of the multiple leg shipment and with a second tracking data corresponding to at least a second shipment leg of the multiple leg shipment, wherein the first shipment leg is a non-consolidated shipment leg, and wherein the second shipment leg comprises a consolidation shipment leg providing consolidation of the item with a group of items to be shipped;

generate updated unified tracking information based on the unified tracking information in response to receipt of an update to at least one of the first tracking data and the second tracking data to maintain an accuracy of the unified tracking information, wherein the at least one processor configured to generate the updated unified tracking information further comprises the at least one processor further configured to:

identify that the first tracking data is inaccurate with respect to the consolidated shipment leg but accurate with respect to the non-consolidated shipment leg, that the second tracking data is inaccurate with respect to the non-consolidated shipment leg but accurate with respect to the consolidated shipment leg, or that the first tracking data is inaccurate with respect to the consolidated shipping leg but accurate with respect to the non-consolidated shipment leg and that the second tracking data is inaccurate with respect to the non-consolidated shipment leg but accurate with respect to the consolidated shipment leg; and manipulate the first tracking data and the second tracking data to generate the unified tracking information, wherein the unified tracking information is further configured to homogenize a formatting of shipment information received from multiple shipment legs from different shipment service providers; and provide the updated unified tracking information to at least one of a shipper or an ultimate recipient of the item.

11. The consolidation management server system of claim 10, wherein the unified tracking information and the updated unified tracking information comprise a substantially unique number.

12. The consolidation management server system of claim 11, wherein the at least one processor is further configured to generate the unified tracking information.

13. The consolidation management server system of claim 10, wherein an update to at least one of the first tracking data or the second tracking data is received in response to at least one of a first event associated with the first tracking data or a second event associated with the second tracking data.

14. The consolidation management server system of claim 13, wherein the first event associated with the first tracking data comprises delivery of the item to an intermediate location.

15. The consolidation management server system of claim 14, wherein the second event comprises consolidation of the item with the group of items as a shipping unit for shipping services of the consolidated shipment leg.

16. A non-transitory machine-readable medium having machine executable instructions which, when executed by a processor of a consolidation management server, causes the consolidation management server to:

assign unified tracking information to an item to be shipped via a multiple leg shipment;

associate a first tracking number for the item with respect to at least one non-consolidation shipment leg of the multiple leg shipment with the unified tracking information, wherein the first tracking number includes first tracking data configured to track the item with respect to the non-consolidation shipment leg;

associate a second tracking number for the item with respect to a consolidated shipment leg of the multiple leg shipment with the unified tracking information, wherein the second tracking number includes second tracking data configured to track the item with respect to the consolidated shipment leg; and update the unified tracking information in response to at least one of a first event reported with respect to the first tracking number and a second event reported with respect to the second tracking number to maintain an accuracy of the unified tracking information with respect to each leg of the multiple leg shipment, wherein the machine executable instructions that, when executed by consolidation management server, cause the consolidation management server to update the unified tracking information further comprise the machine executable instructions that, when executed by the consolidation management server, cause the consolidation management server to:

identify that the first tracking data is inaccurate with respect to the consolidated shipment leg but accurate with respect to the non-consolidated shipment leg, that the second tracking data is inaccurate with respect to the non-consolidated shipment leg but accurate with respect to the consolidated shipment leg, or that the first tracking data is inaccurate with respect to the consolidated shipping leg but accurate with respect to the non-consolidated shipment leg and that the second tracking data is inaccurate with respect to the non-consolidated shipment leg but accurate with respect to the consolidated shipment leg; and manipulate the first tracking data and the second tracking data to generate the unified tracking information, wherein the unified tracking information is further configured to homogenize a formatting of shipment information received from multiple shipment legs from different shipment service providers.

17. The non-transitory machine-readable medium of claim 16, wherein the unified tracking information is configured to accurately reflect a shipment status of the item for each leg of the multiple leg shipment.

18. The non-transitory machine-readable medium of, claim 16 further comprising:

sending the unified tracking information to at least one of a shipper or an ultimate recipient of the item.

\* \* \* \* \*

UNITED STATES PATENT AND TRADEMARK OFFICE
CERTIFICATE OF CORRECTION

| | |
|---|---|
| PATENT NO. | : 11,429,919 B1 |
| APPLICATION NO. | : 17/003177 |
| DATED | : August 30, 2022 |
| INVENTOR(S) | : Harry T. Whitehouse et al. |

It is certified that error appears in the above-identified patent and that said Letters Patent is hereby corrected as shown below:

In the Specification

Column 18, Line 16, delete "of Additionally" and replace with --of. Additionally--.
Column 30, Line 24, delete "LIBER transportation" and replace with --UBER transportation--.

Signed and Sealed this
Twenty-fifth Day of October, 2022

Katherine Kelly Vidal
*Director of the United States Patent and Trademark Office*